United States Patent
Liu et al.

(10) Patent No.: US 9,543,762 B2
(45) Date of Patent: Jan. 10, 2017

(54) WIRE CONNECTING METHOD AND CONVERTER STATION FOR ULTRA-HIGH VOLTAGE DIRECT CURRENT POWER TRANSMISSION, AND ULTRA-HIGH VOLTAGE DIRECT CURRENT POWER TRANSMISSION SYSTEM

(75) Inventors: Zhenya Liu, Beijing (CN); Yinbiao Shu, Beijing (CN); Xin Sun, Beijing (CN); Liying Gao, Beijing (CN)

(73) Assignee: State Grid Corporation of China, Beijing (CN)

( * ) Notice: Subject to any disclaimer, the term of this patent is extended or adjusted under 35 U.S.C. 154(b) by 971 days.

(21) Appl. No.: 13/583,892

(22) PCT Filed: Sep. 6, 2010

(86) PCT No.: PCT/CN2010/001349
§ 371 (c)(1),
(2), (4) Date: Dec. 5, 2012

(87) PCT Pub. No.: WO2012/000144
PCT Pub. Date: Jan. 5, 2012

(65) Prior Publication Data
US 2013/0076118 A1 Mar. 28, 2013

(30) Foreign Application Priority Data
Jun. 30, 2010 (CN) .......................... 2010 1 0223182

(51) Int. Cl.
*H02J 3/36* (2006.01)
(52) U.S. Cl.
CPC . *H02J 3/36* (2013.01); *Y02E 60/60* (2013.01)

(58) Field of Classification Search
CPC .................................. H02J 3/36; Y02E 60/60
See application file for complete search history.

(56) References Cited

U.S. PATENT DOCUMENTS

| | | | | |
|---|---|---|---|---|
| 5,311,418 A * | 5/1994 | Lalander | ............... | H02M 3/315 307/82 |
| 7,002,260 B2 * | 2/2006 | Stahlkopf | ............... | F03D 9/005 290/44 |
| 7,499,291 B2 * | 3/2009 | Han | ........................ | H02M 7/19 363/17 |

(Continued)

FOREIGN PATENT DOCUMENTS

CN 101577417 A 11/2009

OTHER PUBLICATIONS

Dennis Woodford, "HVDC Transmission," Manitoba HVDC Research Center, Mar. 18, 1998, 1-27.*

(Continued)

*Primary Examiner* — Thienvu Tran
*Assistant Examiner* — Pinping Sun
(74) *Attorney, Agent, or Firm* — Christensen O'Connor Johnson Kindness PLLC

(57) ABSTRACT

Connection methods for UHVDC transmission at rectification side and at inversion side, UHV converter stations at rectification side and at inversion side, and an UHVDC transmission system are disclosed. The present invention employs a manner of multiple drop points to solve the problem of poor security stability of electric grid caused by feeding a large amount of power via one point.

44 Claims, 17 Drawing Sheets

(56) References Cited

U.S. PATENT DOCUMENTS

| | | | | |
|---|---|---|---|---|
| 7,518,266 | B2* | 4/2009 | Eckroad | H02J 3/02 307/19 |
| 7,880,419 | B2* | 2/2011 | Sihler | H02M 3/158 318/504 |
| 7,939,970 | B1* | 5/2011 | Walling | F03D 7/0284 290/44 |
| 2004/0125618 | A1* | 7/2004 | De Rooij | H02J 1/102 363/17 |
| 2009/0224607 | A1* | 9/2009 | Kjaer | F03D 9/003 307/82 |
| 2010/0091527 | A1* | 4/2010 | Asplund | H02J 3/36 363/35 |
| 2010/0133901 | A1* | 6/2010 | Zhang | H02M 5/458 307/11 |
| 2010/0327599 | A1* | 12/2010 | Nielsen | F03D 9/003 290/55 |
| 2011/0163603 | A1* | 7/2011 | Chou | H02J 3/381 307/66 |

OTHER PUBLICATIONS

Hu, J., et al., "Main Principle for Electrical Engineering Design of UHVDC Converter System," Sichuan Electric Power Technology 31(3):4-8, Jun. 2008.

Li, L., et al., "Study on the Shared Ground Electrode of Xiangjiaba Converting Station," Electrotechnical Application 26(8):32-36, 2007.

Ma, W.-M., "Key Technical Schemes for ±800kV UHVDC Project From Xiangjiaba to Shanghai," Power System Technology 31(11):1-5, Jun. 2007.

International Search Report and Written Opinion mailed Mar. 31, 2011, issued in corresponding International Application No. PCT/CN2010/001349, filed Sep. 6, 2010, 7 pages.

International Preliminary Report on Patentability mailed Jan. 8, 2013, in corresponding International Application No. PCT/CN2010/001349, filed Sep. 6, 2010, 4 pages.

* cited by examiner

WIRE CONNECTING METHOD AND CONVERTER STATION FOR ULTRA-HIGH VOLTAGE DIRECT CURRENT POWER TRANSMISSION, AND ULTRA-HIGH VOLTAGE DIRECT CURRENT POWER TRANSMISSION SYSTEM

TECHNICAL FIELD

The present invention relates to technical field of ultra-high voltage (UHV), and more specifically, to a connection method for UHV direct current (UHVDC) transmission at rectification side, a connection method for UHVDC transmission at inversion side, a connection method for UHVDC transmission, UHV converter station at rectification side, UHV converter station at inversion side, and UHVDC transmission system.

DESCRIPTION OF THE RELATED ART

The conventional solution for UHVDC transmission project is a power transmission solution of "single sending end, single receiving end". FIG. 1 shows an arrangement of the existing conventional UHV converter station, wherein two HV(high voltage) valve hall 101 and two LV(low voltage) valve hall 102 are arranged in one converter station, each HV(high voltage) valve hall 101 is provided with multiple HV(high voltage) transformers and each LV(low voltage) valve hall 102 is provided with multiple LV(low voltage) transformers. The high and low voltage valve halls are located at the same physical location, that is, each UHV converter station contains both of HV(high voltage) transformer and LV(low voltage) transformer.

The UHV converter station per se is a very complicated project. Since HV(high voltage) transformer in the UHV converter station per se has a larger power capacity as well as a larger dimension volume, it is hard to be transported, so that it must select a place that is convenient for constructing the UHV converter station. For the UHV converter station at rectification side, a plurality of power sources of large capacity need to be converged and output via UHVDC transmission line. However, the power source of large power capacity is usually located at remote area. In that case, the plurality of power sources of large power capacity at different remote areas must be transmitted via alternative current (AC) transmission to the place that is convenient for constructing the UHV converter station, so that a lot of AC loops are required. Referring to FIG. 2, which shows connection method for UHVDC transmission in the prior art. At the rectification side, a power source end 201 transmits converged multi-path high voltage AC power (wherein each path can be 500 KV) to UHV converter station 202 via a power source converging apparatus 205. Particularly, the power source converging apparatus 205 is provided with a bus for AC power convergence and device related to line converging therein. The power source converging apparatus 205 is used for performing converging operation to power sources at a first power source collection point and a second power source collection point within the power source end 201. The UHV converter station 202 at rectification side converts the received multi-path high voltage AC power into UHV DC power, which is then transmitted to the UHV converter station 203 at inversion side. The UHV converter station 203 at inversion side converts the received UHV DC power to AC power required by load, which is then transmitted to load area 204. Currently, UHV converter stations applied in Xiangjiaba-Shanghai±800 KV UHV DC transmission project in the prior art all employ the arrangement as shown in FIG. 1 and the connection method as shown in FIG. 2.

After testing over and over and thorough investigation, people find that the existing UHV converter station and its connection method have at least the following problems:

1. Since the plurality of power sources of large capacity at remote areas are located at a long distance from the UHV converter station at rectification side located at a place convenient for construction, and the power from the plurality of power sources of large capacity must be transmitted to the UHV converter station at rectification side via multi-path AC transmission, the AC connections into the UHV converter station at rectification side have too many loops, leading to high transmission cost and large transmission losses;
2. Since the UHV converter station at inversion side is located at a long distance from the load, power transmission between the both must also in an AC manner, and due to the single receiving end in load area at inversion side, usage of the power at load end is inconvenient;
3. Since the HV(high voltage) transformers per se at rectification side and inversion side have larger power capacity and dimension volume and thus are hard to be transported, and according to the construction requirement of the UHV converter station, the HV(high voltage) transformers therein must be transported to a particular place that is convenient for construction, the transportation is very difficult and costly;
4. Since the single receiving end in load area at inversion side makes a large amount of power be fed into AC electric grid at inversion side via one point (i.e. the single receiving end), an over-strong short circuit current is caused under large system capacity, leading to poor reliability and stability of the electric grid.

SUMMARY OF THE INVENTION

In order to solve the technical problem that the plurality of power sources of large capacity are located at a long distance from the UHV converter station at rectification side, and the power must be transmitted via multi-path AC transmission, so that the AC connections into the UHV converter station at rectification side have too many loops, the present invention provides a connection method for UHV DC transmission at rectification side and an UHV converter station at rectification side.

According to an aspect of the present invention, a connection method for UHVDC transmission at rectification side is provided, the method comprising: setting an UHV HV(high voltage) converter station at rectification side and an UHV low voltage converter station at rectification side respectively; the UHV low voltage converter station at rectification side receiving a first AC power from a first power source collection point, converting the first AC power into a first low voltage DC power and inputting it into the UHV HV(high voltage) converter station at rectification side; the UHV HV(high voltage) converter station at rectification side receiving a second AC power from a second power source collection point and the first low voltage DC power, rectifying the second AC power and then superimposing it with the first low voltage DC power to generate a first UHVDC power, and outputting the first UHVDC power via an UHVDC transmission line.

According to an embodiment of the connection method for UHVDC transmission at rectification side, the UHV HV(high voltage) converter station at rectification side may comprise two HV(high voltage) valve halls with different polarities; the UHV LV(low voltage) converter station at rectification side may comprise two LV(low voltage) valve halls with different polarities.

According to another embodiment of the connection method for UHV DC transmission at rectification side, the two HV(high voltage) valve halls with different polarities are located at different locations and/or the two LV(low voltage) valve halls with different polarities are located at different locations.

According to another aspect of the present invention, an UHV converter station at rectification side is provided, the UHV converter station comprising: an UHV LV(low voltage) converter station at rectification side for receiving a first AC power from a first power source collection point, converting the first AC power into a first low voltage DC power and inputting it into the UHV HV(high voltage) converter station at rectification side; an UHV HV(high voltage) converter station at rectification side for receiving a second AC power from a second power source collection point and the first low voltage DC power, rectifying the second AC power and superimposing it with the first low voltage DC power to generate a first UHVDC power, and outputting the first UHVDC power via an UHVDC transmission line.

According to an embodiment of the UHV converter station at rectification side of the present invention, the UHV LV(low voltage) converter station at rectification side comprises: a first power source input module for receiving a first AC power from a first power source collection point, and transmitting the first AC power to a first power source conversion module; the first power source conversion module for converting the first AC power into a first low voltage DC power and outputting it to the UHV HV(high voltage) converter station at rectification side.

According to another embodiment of the UHV converter station at rectification side of the present invention, the UHV HV(high voltage) converter station at rectification side comprises: a second power source input module for receiving a second AC power from a second power source collection point, and transmitting it to a second power source conversion module; the second power source conversion module for rectifying the second AC power and superimposing it with the first low voltage DC power to generate a first UHVDC power and outputting the first UHVDC power via an UHVDC transmission line.

According to another embodiment of the UHV converter station at rectification side of the present invention, the UHV HV(high voltage) converter station at rectification side comprises two HV(high voltage) valve halls with different polarities; the UHV LV(low voltage) converter station at rectification side comprises two LV(low voltage) valve halls with different polarities.

According to another embodiment of the UHV converter station at rectification side of the present invention, the two HV(high voltage) valve halls with different polarities are located at different locations and/or the two LV(low voltage) valve halls with different polarities are located at different locations.

According to another aspect of the present invention, a connection method for UHVDC transmission at rectification side is provided, the method comprising: setting an UHV HV(high voltage) converter station at rectification side, an UHV LV(low voltage) converter station at rectification side, and an UHV MV(medium voltage) converter station at rectification side respectively; the UHV LV(low voltage) converter station at rectification side receiving a first AC power from a first power source collection point, converting the first AC power into a first low voltage DC power and inputting it into the UHV MV(medium voltage) converter station at rectification side; the UHV MV(medium voltage) converter station at rectification side receiving an AC power and the first low voltage DC power, rectifying the AC power and superimposing it with the first low voltage DC power to generate a first medium voltage DC power and outputting the first medium voltage DC power to the UHV HV(high voltage) converter station at rectification side; the UHV HV(high voltage) converter station at rectification side receiving a second AC power from a second power source collection point and the first medium voltage DC power, rectifying the second AC power and superimposing it with the first medium voltage DC power to generate a first UHVDC power and outputting the first UHVDC power via an UHVDC transmission line.

According to an embodiment of the connection method for UHVDC transmission at rectification side of the present invention, the number of the UHV MV(medium voltage) converter station at rectification side is one or more.

According to another embodiment of the connection method for UHVDC transmission at rectification side of the present invention, when the number of the UHV MV(medium voltage) converter station at rectification side is two or more, the two or more UHV MV(medium voltage) converter stations at rectification side are cascaded sequentially. The method further comprises: each of the UHV MV(medium voltage) converters at rectification side receiving corresponding AC power and the input DC power, rectifying the corresponding AC power and superimposing it with the input DC power, and outputting the superimposed DC power.

According to another embodiment of the connection method for UHVDC transmission at rectification side of the present invention, the UHV HV(high voltage) converter station at rectification side comprises two HV(high voltage) valve halls with different polarities; the UHV MV(medium voltage) converter station at rectification side comprises two MV(medium voltage) valve halls with different polarities; the UHV LV(low voltage) converter station at rectification side comprises two LV(low voltage) valve halls with different polarities.

According to another embodiment of the connection method for UHVDC transmission at rectification side of the present invention, the two HV(high voltage) valve halls with different polarities are located at different locations, and/or the two MV(medium voltage) valve halls with different polarities are located at different locations, and/or the two LV(low voltage) valve halls with different polarities are located at different locations.

According to another aspect of the present invention, an UHV converter station at rectification side is provided, the UHV converter station at rectification side comprising: an UHV LV(low voltage) converter station at rectification side for receiving a first AC power from a first power source collection point, converting the first AC power into a first low voltage DC power and inputting it into the UHV MV(medium voltage) converter station at rectification side; the UHV MV(medium voltage) converter station at rectification side for receiving an AC power and a first low voltage DC power, rectifying the AC power and superimposing it with the first low voltage DC power to generate a first medium voltage DC power and inputting the first medium voltage DC power into an UHV HV(high voltage) converter station at rectification side; the UHV HV(high voltage) converter station at rectification side for receiving a second AC power from a second power source collection point and the first medium voltage DC power, rectifying the second AC power and superimposing it with the first medium voltage DC power to generate a first UHVDC power and outputting the first UHVDC power via an UHVDC transmission line.

According to an embodiment of the UHV converter station at rectification side of the present invention, the UHV LV(low voltage) converter station at rectification side comprises: a first power source input module for receiving a first AC power from a first power source collection point, and transmitting the first AC power to a first power source conversion module; the first power source conversion module for converting the first AC power into a first low voltage DC power and outputting it to the UHV MV(medium voltage) converter station at rectification side connected to the UHV LV(low voltage) converter station at rectification side.

According to another embodiment of the UHV converter station at rectification side of the present invention, the number of the UHV MV(medium voltage) converter station at rectification side is one or more.

According to another embodiment of the UHV converter station at rectification side of the present invention, when there are two or more UHV MV(medium voltage) converter stations at rectification side, the two or more UHV MV(medium voltage) converter stations at rectification side are cascaded sequentially.

According to another embodiment of the UHV converter station at rectification side of the present invention, the UHV MV(medium voltage) converter station at rectification side comprises: a fifth power source input module for receiving an AC power from a corresponding power source collection point, and transmitting it to the fifth power source conversion module; the fifth power source conversion module for rectifying the AC power and superimposing it with the input DC power, and outputting the superimposed DC power.

According to another embodiment of the UHV converter station at rectification side of the present invention, the UHV HV(high voltage) converter station at rectification side comprises: a second power source input module for receiving a second AC power from a second power source collection point, and transmitting it to a second power source conversion module; the second power source conversion module for rectifying the second AC power and superimposing it with the input DC power to generate a first UHVDC power and outputting the first UHVDC power via UHVDC transmission line.

According to another embodiment of the UHV converter station at rectification side of the present invention, the UHV HV(high voltage) converter station at rectification side comprises two HV(high voltage) valve halls with different polarities; the UHV MV(medium voltage) converter station at rectification side comprises two MV(medium voltage) valve halls with different polarities; the UHV LV(low voltage) converter station at rectification side comprises two LV(low voltage) valve halls with different polarities.

According to another embodiment of the UHV converter station at rectification side of the present invention, the two HV(high voltage) valve halls with different polarities are located at different locations, and/or the two MV(medium voltage) valve halls with different polarities are located at different locations, and/or the two LV(low voltage) valve halls with different polarities are located at different locations.

According to the connection method for UHVDC transmission at rectification side and the UHV converter station at rectification side of the present invention, the UHV HV(high voltage) converter station at rectification side and the UHV LV(low voltage) converter station at rectification side are set separately, so that it is unnecessary to converge power sources at the first and second power source collection point. Therefore, the number of the loops of the AC lines between the first power source collection point, the second power source collection point and the UHV converter station at rectification side is reduced, the transmission cost and transmission loss are reduced, and better economic benefit can be obtained. In addition, since the UHV HV(high voltage) and LV(low voltage) converter station at rectification side can be set separately, the problem that it is difficult to transport HV(high voltage) transformer can be solved. Therefore, construction cost is greatly reduced, and the cost for transportation is reduced. The above embodiment can also facilitate access of the dispersed power sources. For example, the power output from two or more medium size power stations or plants within 200-300 km distance can be bound and sent to a location at long distance, so that a lot of AC transmission lines can be saved, which reduces power loss.

In order to solve the technical problem that the UHV converter station at inversion side is located at a long distance from the load, and single receiving end in load area makes usage of the power inconvenient at the load end, the present invention further provide a connection method for UHVDC transmission at inversion side and an UHV converter station at inversion side.

According to an aspect of the present invention, a connection method for UHVDC transmission at inversion side is provided, the method comprising: setting an UHV HV(high voltage) converter station at inversion side and an UHV LV(low voltage) converter station at inversion side respectively; the UHV HV(high voltage) converter station at inversion side inputting a first UHVDC power via an UHVDC transmission line, and outputting a third AC power and a second low voltage DC power, and transmitting the third AC power to a first load area; the UHV LV(low voltage) converter station at inversion side converting the second low voltage DC power into the fourth AC power and transmitting it to a second load area.

According to an embodiment of the connection method for UHVDC transmission at inversion side, the UHV HV(high voltage) converter station at inversion side may comprise two HV(high voltage) valve halls with different polarities; the UHV LV(low voltage) converter station at inversion side may comprise two LV(low voltage) valve halls with different polarities.

According to another embodiment of the connection method for UHVDC transmission at rectification side, the two HV(high voltage) valve halls with different polarities are located at different locations and/or the two LV(low voltage) valve halls with different polarities are located at different locations.

According to another aspect of the present invention, an UHV converter station at inversion side is provided, the UHV converter station at inversion side comprising UHV HV(high voltage) converter station at inversion side for inputting a first UHVDC power via an UHVDC transmission line, outputting a third AC power and a second low voltage DC power, and transmitting the third AC power to a first load area; an UHV LV(low voltage) converter station at inversion side for converting the second low voltage DC power into a fourth AC power and transmitting it to a second load area.

According to an embodiment of the UHV converter station at inversion side of the present invention, the UHV HV(high voltage) converter station at inversion side comprises: a fourth power source input module for receiving the first UHVDC power input via the UHVDC transmission line and transmitting it to a fourth power source conversion module; the fourth power source conversion module for receiving the first UHVDC power, outputting the third AC power and the second low voltage DC power, transmitting the third AC power to the first load area, and transmitting the second low voltage DC power to the UHV LV(low voltage) converter station at inversion side.

According to another embodiment of the UHV converter station at inversion side of the present invention, the UHV LV(low voltage) converter station at inversion side comprises: a third power source input module for receiving the second low voltage DC power and transmitting it to a third power source conversion module; the third power source conversion module for converting the second low voltage DC power into a fourth AC power, and transmitting it to the second load area.

According to another embodiment of the UHV converter station at inversion side of the present invention, the UHV HV(high voltage) converter station at inversion side comprises two HV(high voltage) valve halls with different polarities; the UHV LV(low voltage) converter station at inversion side comprises two LV(low voltage) valve halls with different polarities.

According to another embodiment of the UHV converter station at inversion side of the present invention, the two HV(high voltage) valve halls with different polarities are located at different locations and/or the two LV(low voltage) valve halls with different polarities are located at different locations.

According to another aspect of the present invention, a connection method for UHVDC transmission at inversion side is provided, the method comprising: setting an UHV HV(high voltage) converter station at inversion side, an UHV LV(low voltage) converter station at inversion side, and an UHV MV(medium voltage) converter station respectively; the UHV HV(high voltage) converter station at inversion side inputting a first UHVDC power via an UHVDC transmission line, and outputting a third AC power and a second medium voltage DC power; transmitting the third AC power to a first load area; the UHV MV(medium voltage) converter station at inversion side receiving the second medium voltage DC power, outputting an AC power and a second low voltage DC power, and transmitting the output AC power to a corresponding load area; the UHV LV(low voltage) converter station at inversion side converting the second low voltage DC power into a fourth AC power and transmitting it to a second load area.

According to an embodiment of the connection method for UHVDC transmission at inversion side of the present invention, the number of the UHV MV(medium voltage) converter station at inversion side is one or more.

According to another embodiment of the connection method for UHVDC transmission at inversion side of the present invention, when there are two or more UHV MV(medium voltage) converter stations at inversion side, the two or more UHV MV(medium voltage) converter stations at inversion side are cascaded sequentially. The method further comprises: each of the UHV MV(medium voltage) converter stations at inversion side receiving input DC power, and outputting a corresponding AC power and DC power, and transmitting the corresponding AC power to a corresponding load area.

According to another embodiment of the connection method for UHVDC transmission at inversion side, the UHV HV(high voltage) converter station at inversion side comprises two HV(high voltage) valve halls with different polarities; the UHV MV(medium voltage) converter station at inversion side comprises two MV(medium voltage) valve halls with different polarities; the UHV LV(low voltage) converter station at inversion side comprises two LV(low voltage) valve halls with different polarities.

According to another embodiment of the connection method for UHVDC transmission at inversion side, the two HV(high voltage) valve halls with different polarities are located at different locations, and/or the two MV(medium voltage) valve halls with different polarities are located at different locations, and/or the two LV(low voltage) valve halls with different polarities are located at different locations.

According to another aspect of the present invention, an UHV converter station at inversion side is provided, the UHV converter station at inversion side comprising: an UHV HV(high voltage) converter station at inversion side for inputting a first UHVDC power via an UHVDC transmission line, and outputting a third AC power and a second medium voltage DC power, and transmitting the third AC power to a first load area, transmitting the second medium voltage DC power to the UHV MV(medium voltage) converter station at inversion side; the UHV MV(medium voltage) converter station at inversion side for receiving the second medium voltage DC power, outputting a AC power and a second low voltage DC power, and transmitting the output AC power to a corresponding load area; an UHV LV(low voltage) converter station at inversion side for receiving the second low voltage DC power, and converting it into a fourth AC power and transmitting it to a second load area.

According to an embodiment of the UHV converter station at inversion side of the present invention, the UHV HV(high voltage) converter station at inversion side comprises: a fourth power source input module for receiving the first UHVDC power input via the UHVDC transmission line and transmitting it to a fourth power source conversion module; the fourth power source conversion module for receiving the first UHVDC power, outputting the third AC power and the second medium voltage DC power, transmitting the third AC power to the first load area, and transmitting the second medium voltage DC power to the UHV MV(medium voltage) converter station at inversion side connected with the UHV HV(high voltage) converter station at inversion side.

According to another embodiment of the UHV converter station at inversion side of the present invention, the number of the UHV MV(medium voltage) converter station at inversion side is one or more.

According to another embodiment of the UHV converter station at inversion side of the present invention, when there are two or more UHV MV(medium voltage) converter stations at inversion side, the two or more UHV MV(medium voltage) converter stations at inversion side are cascaded sequentially.

According to another embodiment of the UHV converter station at inversion side of the present invention, the UHV MV(medium voltage) converter station at inversions side comprises: a sixth power source input module for receiving input DC power and transmitting it to a sixth power source conversion module; the sixth power source conversion module for receiving input DC power and outputting AC power and DC power and transmitting the output AC power to a corresponding load area.

According to another embodiment of the UHV converter station at inversion side of the present invention, the UHV LV(low voltage) converter station at inversions side comprises: a third power source input module for receiving input DC power and transmitting it to a third power source conversion module; the third power source conversion module for converting the input DC power into the fourth AC power and transmitting it to the second load area.

According to another embodiment of the UHV converter station at inversion side of the present invention, the UHV HV(high voltage) converter station at inversion side comprises two HV(high voltage) valve halls with different polarities; the UHV MV(medium voltage) converter station at inversion side comprises two MV(medium voltage) valve halls with different polarities; the UHV LV(low voltage) converter station at inversion side comprises two LV(low voltage) valve halls with different polarities.

According to another embodiment of the UHV converter station at inversion side of the present invention, the two HV(high voltage) valve halls with different polarities of the UHV HV(high voltage) converter station at inversion side are located at different locations, and/or the two MV(medium voltage) valve halls with different polarities of the UHV MV(medium voltage) converter station at inversion side are located at different locations, and/or the two LV(low voltage) valve halls with different polarities of the UHV LV(low voltage) converter station at inversion side are located at different locations.

According to the connection method for UHVDC transmission at inversion side and the UHV converter station at inversion side of the present invention, the UHV HV(high voltage) converter station at inversion side and the UHV LV(low voltage) converter station at inversion side are set separately, so that the power can be projected directly to a plurality of load centers, which not only reduces power foldback and power loss due to power transmission among load areas, but also can provide electric energy to the load end more conveniently at the same time. By means of gradually dispersing energy, i.e. setting a plurality of load centers at inversion side, it is convenient to access to AC system of the respective load areas. Moreover, since the UHV HV(high voltage) converter station at inversion side and UHV LV(low voltage) converter station are constructed separately, the power can be transmitted directly to the first load area and the second load area respectively, which reduces the cost for power transmission between the UHV converter station at inversion side and the load, and facilities transmitting power to different load areas. Meanwhile, the problem that it is difficult to transport HV(high voltage) transformer can also be solved, construction cost is greatly reduced, and the cost for transportation is reduced. Moreover, compared with the single receiving end in the prior art, the method of using multiple receiving ends in the present invention can simplify network structure at inversion side, and will not cause unqualified short circuit current due to over-strong short circuit current of partial AC grid caused by over-large system capacity, so that the problem in the prior art that the electric grid has a poor reliability and stability because the single receiving end in load area at inversion side makes a large amount of power be fed into AC electric grid at inversion side via one point is solved effectively; the problem of poor reliability of multiple ends in parallel, that is, if one converter is cut, all the converters with the same polarity must be cut, is also solved.

In order to solve the technical problem that the plurality of power sources of large capacity are located at a long distance from the UHV converter station at rectification side, and the power must be transmitted via multi-path AC power, so that the AC lines into the UHV converter station at rectification side have too many loops, the present invention provides a connection method for UHVDC transmission and an UHVDC transmission system.

According to an aspect of the present invention, a connection method for UHVDC transmission is provided, the method comprising: setting an UHV HV(high voltage) converter station at rectification side and an UHV LV(low voltage) converter station at rectification side respectively; setting an UHV HV(high voltage) converter station at inversion side and an UHV LV(low voltage) converter station at inversion side respectively; the UHV LV(low voltage) converter station at rectification side receiving a first AC power from a first power source collection point, converting the first AC power into a first low voltage DC power and inputting it to the UHV HV(high voltage) converter station at rectification side; the UHV HV(high voltage) converter station at rectification side receiving a second AC power from a second power source collection point and the first low voltage DC power, rectifying the second AC power and superimposing it with the first low voltage DC power to generate a first UHVDC power and outputting the first UHVDC power via an UHVDC transmission line; the UHV HV(high voltage) converter station at inversion side inputting the first UHVDC power via the UHVDC transmission line, and outputting a third AC power and a second low voltage DC power, and transmitting the third AC power to a first load area; the UHV LV(low voltage) converter station at inversion side converting the second low voltage DC power into a fourth AC power and transmitting it to a second load area.

According to an embodiment of the connection method for UHVDC transmission of the present invention, the UHV HV(high voltage) converter station at rectification side comprises two HV(high voltage) valve halls with different polarities; the UHV LV(low voltage) converter station at rectification side comprises two LV(low voltage) valve halls with different polarities.

According to another embodiment of the connection method for UHVDC transmission of the present invention, the two HV(high voltage) valve halls with different polarities are located at different locations and/or the two LV(low voltage) valve halls with different polarities are located at different locations.

According to another embodiment of the connection method for UHVDC transmission of the present invention, the UHV HV(high voltage) converter station at inversion side comprises two HV(high voltage) valve halls with different polarities; the UHV LV(low voltage) converter station at inversion side comprises two LV(low voltage) valve halls with different polarities.

According to another embodiment of the connection method for UHVDC transmission of the present invention, the two HV(high voltage) valve halls with different polarities of the UHV HV(high voltage) converter station at inversion side are located at different locations and/or the two LV(low voltage) valve halls with different polarities of the UHV LV(low voltage) converter station at inversion side are located at different locations.

According to another aspect of the present invention, a connection method for UHVDC transmission is provided, the method comprising: setting an UHV HV(high voltage) converter station at rectification side, an UHV LV(low voltage) converter station at rectification side, and an UHV MV(medium voltage) converter station at rectification side respectively; setting an UHV HV(high voltage) converter station at inversion side, an UHV LV(low voltage) converter station at inversion side, and an UHV MV(medium voltage) converter station at inversion side respectively; the UHV LV(low voltage) converter station at rectification side receiving a first AC power from a first power source collection point, converting the first AC power into the a first low voltage DC power and inputting it to the UHV MV(medium voltage) converter station at rectification side; the UHV MV(medium voltage) converter station at rectification side receiving an AC power and the first low voltage DC power, rectifying the AC power and superimposing it with the first low voltage DC power to generate a first medium voltage DC power, and inputting the first medium voltage DC power to the UHV HV(high voltage) converter station at rectification side; the UHV HV(high voltage) converter station at rectification side receiving a second AC power from a second power source collection point and the first medium voltage DC power, rectifying the second AC power and superimposing it with the first medium voltage DC power to generate a first UHVDC power and outputting the first UHVDC power via an UHVDC transmission line; the UHV HV(high voltage) converter station at inversion side inputting the first UHVDC power via the UHVDC transmission line, and outputting a third AC power and a second medium voltage DC power, and transmitting the third AC power to a first load area; the UHV MV(medium voltage) converter station at inversion side receiving the second medium voltage DC power, outputting an AC power and a second low voltage DC power, and transmitting the output AC power to a corresponding load area; and the UHV LV(low voltage) converter station at inversion side converting the second low voltage DC power into a fourth AC power and transmitting it to a second load area.

According to an embodiment of the connection method for UHVDC transmission of the present invention, the number of the UHV MV(medium voltage) converter station at rectification side is one or more.

According to another embodiment of the connection method for UHVDC transmission of the present invention, when there are two or more UHV MV(medium voltage) converter stations at rectification side, the two or more UHV MV(medium voltage) converter stations at rectification side are cascaded sequentially. The method further comprises: each of the UHV MV(medium voltage) converters at rectification side receiving a corresponding AC power and input DC power, rectifying the corresponding AC power and superimposing it with the input DC power, and outputting the superimposed DC power.

According to another embodiment of the connection method for UHVDC transmission of the present invention, the number of the UHV MV(medium voltage) converter station at inversion side is one or more.

According to another embodiment of the connection method for UHVDC transmission of the present invention, when there are two or more UHV MV(medium voltage) converter stations at inversion side, the two or more UHV MV(medium voltage) converter stations at inversion side are cascaded sequentially. The method further comprises: each of the UHV MV(medium voltage) converter stations at inversion side receiving input DC power, outputting a corresponding AC power and DC power, and transmitting the corresponding AC power to a corresponding load area.

According to another embodiment of the connection method for UHVDC transmission of the present invention, the UHV HV(high voltage) converter station at rectification side comprises two HV(high voltage) valve halls with different polarities; the UHV MV(medium voltage) converter station at rectification side comprises two MV(medium voltage) valve halls with different polarities; and the UHV LV(low voltage) converter station at rectification side comprises two LV(low voltage) valve halls with different polarities.

According to another embodiment of the connection method for UHVDC transmission of the present invention, the two HV(high voltage) valve halls with different polarities are located at different locations, and/or the two MV(medium voltage) valve halls with different polarities are located at different locations, and/or the two LV(low voltage) valve halls with different polarities are located at different locations.

According to another embodiment of the connection method for UHVDC transmission of the present invention, the UHV HV(high voltage) converter station at inversion side comprises two HV(high voltage) valve halls with different polarities; the UHV MV(medium voltage) converter station at inversion side comprises two MV(medium voltage) valve halls with different polarities; the UHV LV(low voltage) converter station at inversion side comprises two LV(low voltage) valve halls with different polarities.

According to another embodiment of the connection method for UHVDC transmission of the present invention, the two HV(high voltage) valve halls with different polarities of the UHV HV(high voltage) converter station at inversion side are located at different locations, and/or the two MV(medium voltage) valve halls with different polarities of the UHV MV(medium voltage) converter station at inversion side are located at different locations, and/or the two LV(low voltage) valve halls with different polarities of the UHV LV(low voltage) converter station at inversion side are located at different locations.

According to another aspect of the present invention, an UHVDC transmission system is provided, the system comprising the UHV converter station at rectification side and the UHV converter station at inversion side of the above embodiments, wherein the UHV HV(high voltage) converter station at rectification side in the UHV converter station at rectification side and UHV HV(high voltage) converter station at inversion side in the UHV converter station at inversion side are connected via the UHVDC transmission line.

According to an embodiment of the UHVDC transmission system of the present invention, the UHV HV(high voltage) converter station at rectification side comprises two HV(high voltage) valve halls with different polarities; the UHV LV(low voltage) converter station at rectification side comprises two LV(low voltage) valve halls with different polarities.

According to another embodiment of the UHVDC transmission system of the present invention, the two HV(high voltage) valve halls with different polarities are located at different locations and/or the two LV(low voltage) valve halls with different polarities are located at different locations.

According to another embodiment of the UHVDC transmission system of the present invention, the UHV HV(high voltage) converter station at inversion side comprises two HV(high voltage) valve halls with different polarities; the UHV LV(low voltage) converter station at inversion side comprises two LV(low voltage) valve halls with different polarities.

According to another embodiment of the UHVDC transmission system of the present invention, the two HV(high voltage) valve halls with different polarities of the UHV HV(high voltage) converter station at inversion side are located at different locations and/or the two LV(low voltage) valve halls with different polarities of the UHV LV(low voltage) converter station at inversion side are located at different locations.

According to another embodiment of the UHVDC transmission system of the present invention, the number of the UHV MV(medium voltage) converter station at rectification side is one or more.

According to another embodiment of the UHVDC transmission system of the present invention, when there are two or more UHV MV(medium voltage) converter stations at rectification side, the two or more UHV MV(medium voltage) converter stations at rectification side are cascaded sequentially.

According to another embodiment of the UHVDC transmission system of the present invention, the number of the UHV MV(medium voltage) converter station at inversion side is one or more.

According to another embodiment of the UHVDC transmission system of the present invention, when there are two or more UHV MV(medium voltage) converter stations at inversion side, the two or more UHV MV(medium voltage) converter stations at inversion side are cascaded sequentially.

According to another embodiment of the UHVDC transmission system of the present invention, the UHV HV(high voltage) converter station at rectification side comprises two HV(high voltage) valve halls with different polarities; the UHV MV(medium voltage) converter station at rectification side comprises two MV(medium voltage) valve halls with different polarities; and the UHV LV(low voltage) converter station at rectification side comprises two LV(low voltage) valve halls with different polarities.

According to another embodiment of the UHVDC transmission system of the present invention, the two HV(high voltage) valve halls with different polarities are located at different locations, and/or the two MV(medium voltage) valve halls with different polarities are located at different locations, and/or the two LV(low voltage) valve halls with different polarities are located at different locations.

According to another embodiment of the UHVDC transmission system of the present invention, the UHV HV(high voltage) converter station at inversion side comprises two HV(high voltage) valve halls with different polarities; the UHV MV(medium voltage) converter station at inversion side comprises two MV(medium voltage) valve halls with different polarities; the UHV LV(low voltage) converter station at inversion side comprises two LV(low voltage) valve halls with different polarities.

According to another embodiment of the UHVDC transmission system of the present invention, the two HV(high voltage) valve halls with different polarities of the UHV HV(high voltage) converter station at inversion side are located at different locations, and/or the two MV(medium voltage) valve halls with different polarities of the UHV MV(medium voltage) converter station at inversion side are located at different locations, and/or the two LV(low voltage) valve halls with different polarities of the UHV LV(low voltage) converter station at inversion side are located at different locations.

According to the connection method for UHVDC transmission and the UHVDC transmission system of the present invention, the UHV HV(high voltage) converter station at rectification side and the UHV LV(low voltage) converter station at rectification side are set separately, and the UHV HV(high voltage) converter station at inversion side and the UHV LV(low voltage) converter station at inversion side are set separately, so that it is not only unnecessary to converge power sources for the first and second power source collection points at rectification side, which reduces the number of the loops of AC lines into the UHV converter station at rectification side, reduces the transmission cost and power transmission loss, and obtains better economic benefit, but also the electric energy can be projected directly to multiple load centers at inversion side, which reduces power foldback and power loss due to power transmission among load areas while can facilitate the load end to use the supplied electric energy.

BRIEF DESCRIPTION OF THE DRAWINGS

In order to describe the technical solutions of embodiments of the present invention and the prior art, drawings used in description of the embodiments and prior art are introduced briefly below. Obviously, the drawings referenced in the following description are only exemplify typical embodiments of the present invention and other drawings can also be contemplated by those skilled in the art without any creative efforts.

DETAILED DESCRIPTION OF THE PREFERRED EMBODIMENT

In the following discussion, the technical solutions of the embodiments of the present invention will be described clearly and thoroughly in conjunction with the drawings of the embodiments of the present invention. It is apparent that the embodiments explained are merely a portion of the embodiments of the present invention, rather than all embodiments. On the basis of the embodiments in the present invention, other embodiments obtained by those skilled in the art without any creative efforts are all within the scope of the present invention.

In the diagram of structure and connection method below, bold solid line represents DC transmission, while thin solid line represents AC transmission.

Figure 3:
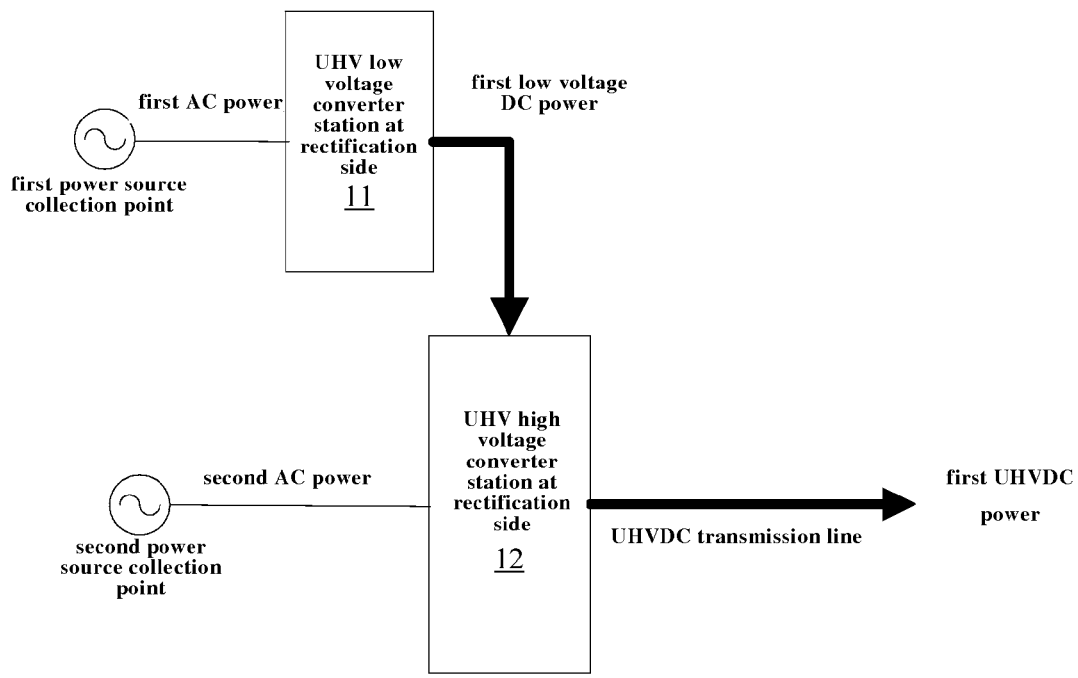
FIG. 3 shows structure and connection diagram according to the first embodiment of the UHV converter station at rectification side of the present invention.

FIG. 3 shows structure and connection diagram according to the first embodiment of the UHV converter station at rectification side of the present invention.

As shown in FIG. 3, the UHV converter station at rectification side of the embodiment comprises:

an UHV LV(low voltage) converter station at rectification side 11 for receiving a first AC power from a first power source collection point, converting the first AC power into a first low voltage DC power and inputting it into an UHV HV(high voltage) converter station at rectification side;

the UHV HV(high voltage) converter station at rectification side 12 for receiving a second AC power from a second power source collection point and the first low voltage DC power, rectifying the second AC power and superimposing it with the first low voltage DC power to generate a first UHVDC power and outputting the first UHVDC power via an UHVDC transmission line.

Specifically, the UHV LV(low voltage) converter station at rectification side 11 may comprise:

a first power source input module for receiving the first AC power from the first power source collection point, and transmitting the first AC power to a first power source conversion module;

the first power source conversion module for converting the first AC power into the first low voltage DC power and outputting it to the UHV HV(high voltage) converter station at rectification side.

The UHV HV(high voltage) converter station at rectification side 12 may comprise:

a second power source input module for receiving the second AC power from the second power source collection point, and transmitting it to a second power source conversion module;

the second power source conversion module for rectifying the second AC power and superimposing it with the first low voltage DC power to generate the first UHVDC power and outputting the first UHVDC power via the UHVDC transmission line.

The UHV HV(high voltage) converter station at rectification side is made to comprise only HV(high voltage) transformers and do not comprise LV(low voltage) transformers; and the UHV LV(low voltage) converter station at rectification side is made to comprise only LV(low voltage) transformers and do not comprise HV(high voltage) transformers.

Figure 4:
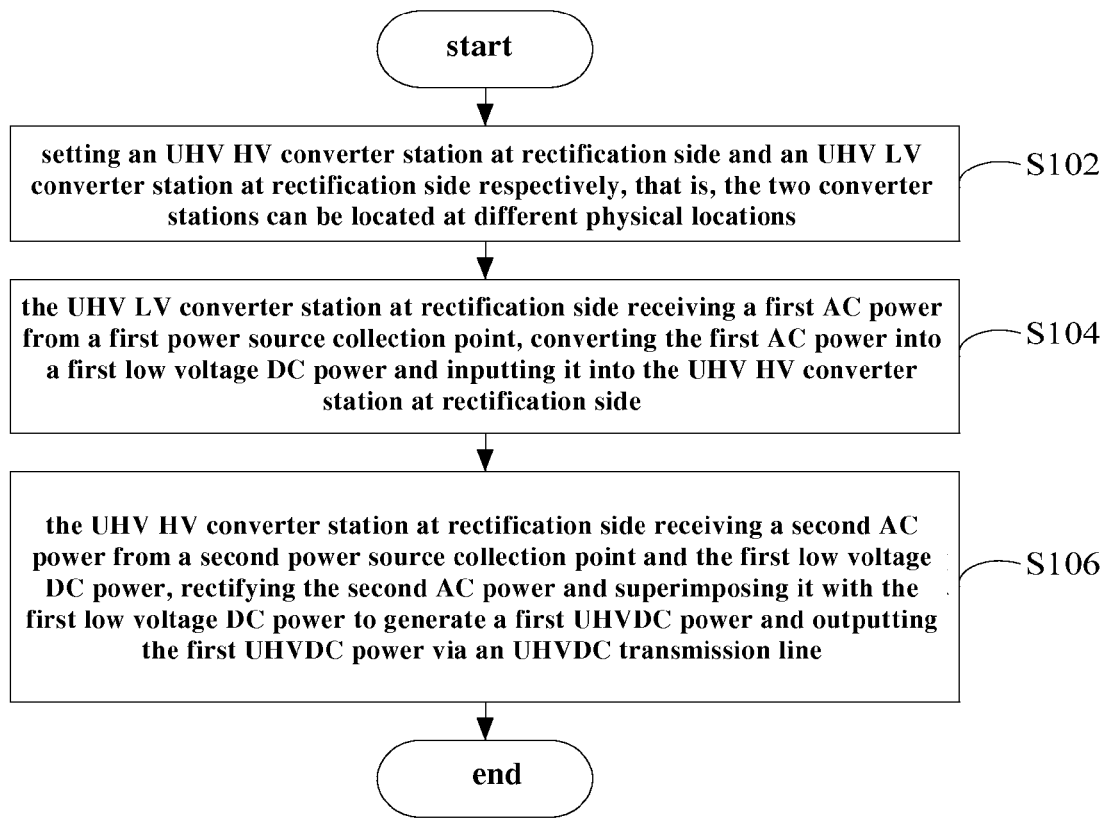
FIG. 4 shows a flow chart of the connection method of the UHV converter station at rectification side according to the first embodiment as shown in FIG. 3.

FIG. 4 shows a flow chart of the connection method of the UHV converter station at rectification side according to the first embodiment as shown in FIG. 3.

As shown in FIG. 4, this embodiment can comprise the following steps:

S102: setting an UHV HV(high voltage) converter station at rectification side and an UHV LV(low voltage) converter station at rectification side respectively, that is, the two converter stations can be located at different physical locations;

S104: the UHV LV(low voltage) converter station at rectification side receiving a first AC power from a first power source collection point, converting the first AC power into a first low voltage DC power and inputting it into the UHV HV(high voltage) converter station at rectification side;

S106: the UHV HV(high voltage) converter station at rectification side receiving a second AC power from a second power source collection point and the first low voltage DC power, rectifying the second AC power and superimposing it with the first low voltage DC power to generate a first UHVDC power and outputting the first UHVDC power via an UHV DC transmission line.

Wherein, the voltage of the first UHVDC power may be above ±750 KV. For example, the voltage of the first UHVDC power is ±800 KV or ±1000 KV.

When the voltage of the first UHVDC power is ±800 KV, the voltage of the first low voltage DC power may be in a range of 300 KV-660 KV. Preferably, the voltage of the first low voltage DC power is half of that of the first UHVDC power, i.e., 400 KV.

Take the above superimposing process as an example, if the voltage of the first low voltage DC power is 400 KV, and the voltage of the rectified second AC power is 400 KV, then the first UHVDC power obtained by superimposing the both is 800 KV.

The above first and second AC power can both include one or more AC loops, the voltage of which and its determination principle are the same as that in the prior art, and will not be described in detail herein.

It is necessary to explain that, the above UHV HV(high voltage) converter station at rectification side may comprise one HV(high voltage) valve hall or two HV(high voltage) valve halls with different polarities. That is, one UHV HV(high voltage) converter station at rectification side may consist of one HV(high voltage) valve hall or two HV(high voltage) valve halls. Correspondingly, the UHV LV(low voltage) converter station at rectification side may comprise one LV(low voltage) valve hall or two LV(low voltage) valve halls with different polarities.

When the UHV HV(high voltage) converter station at rectification side comprises two HV(high voltage) valve halls with different polarities, the two HV(high voltage) valve halls with different polarities may be located at different locations. At this time, the two LV(low voltage) valve halls in the UHV LV(low voltage) converter station at rectification side may be located at the same location or different locations.

When the UHV LV(low voltage) converter station at rectification side comprises two LV(low voltage) valve halls with different polarities, the two LV(low voltage) valve halls with different polarities may be located at different locations. At this time, the two HV(high voltage) valve halls in the UHV HV(high voltage) converter station at rectification side may be located at the same location or different locations.

Figure 5:
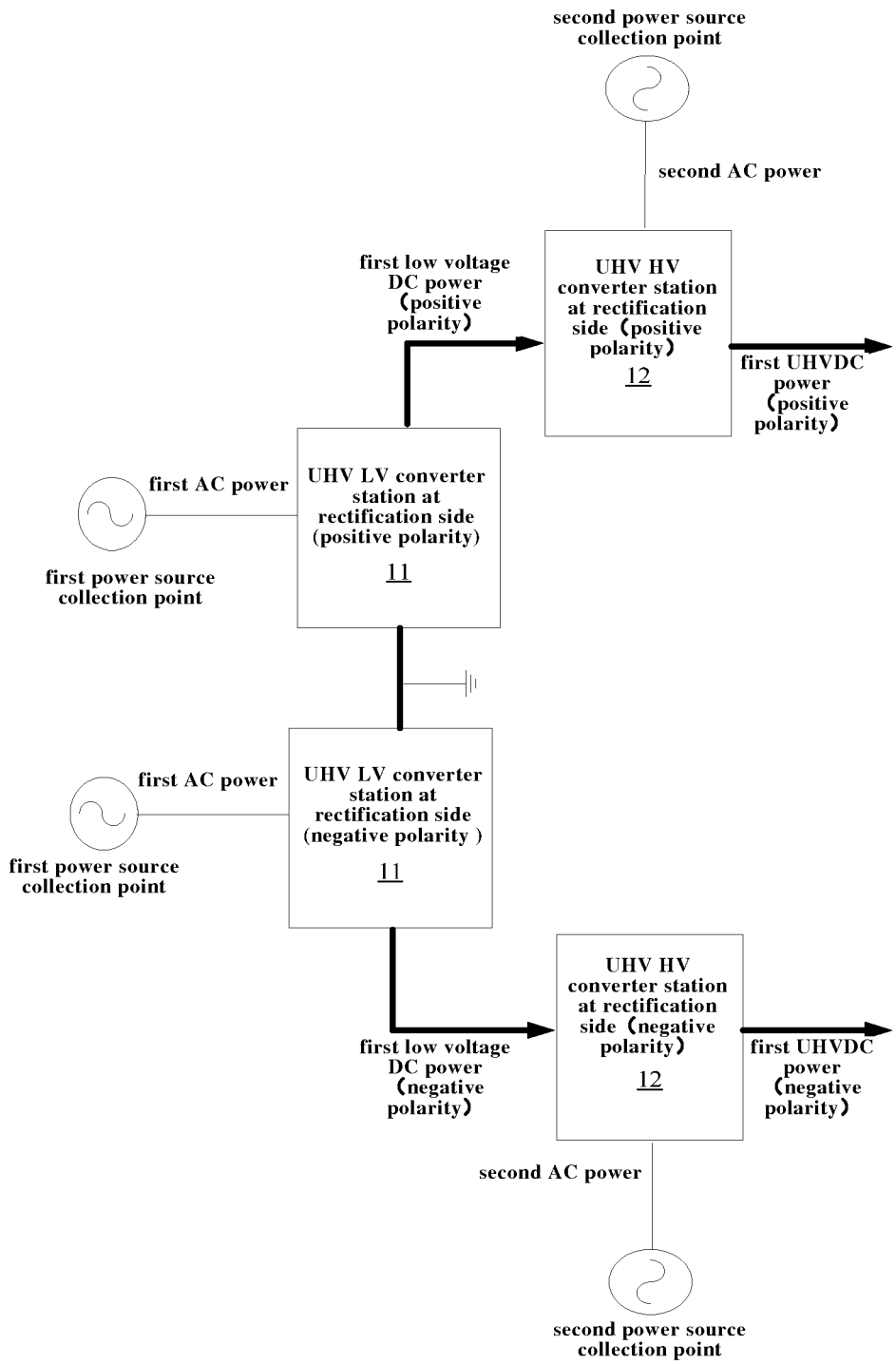
FIG. 5 shows a connection diagram of the UHV converter station at rectification side of the present invention, wherein the high and LV(low voltage) valve halls are at different locations.

FIG. 5 shows the case where the two HV(high voltage) valve halls of the UHV HV(high voltage) converter station at rectification side are located at different locations, and the two LV(low voltage) valve halls of the UHV LV(low voltage) converter station at rectification side are also located at different locations.

Figure 6:
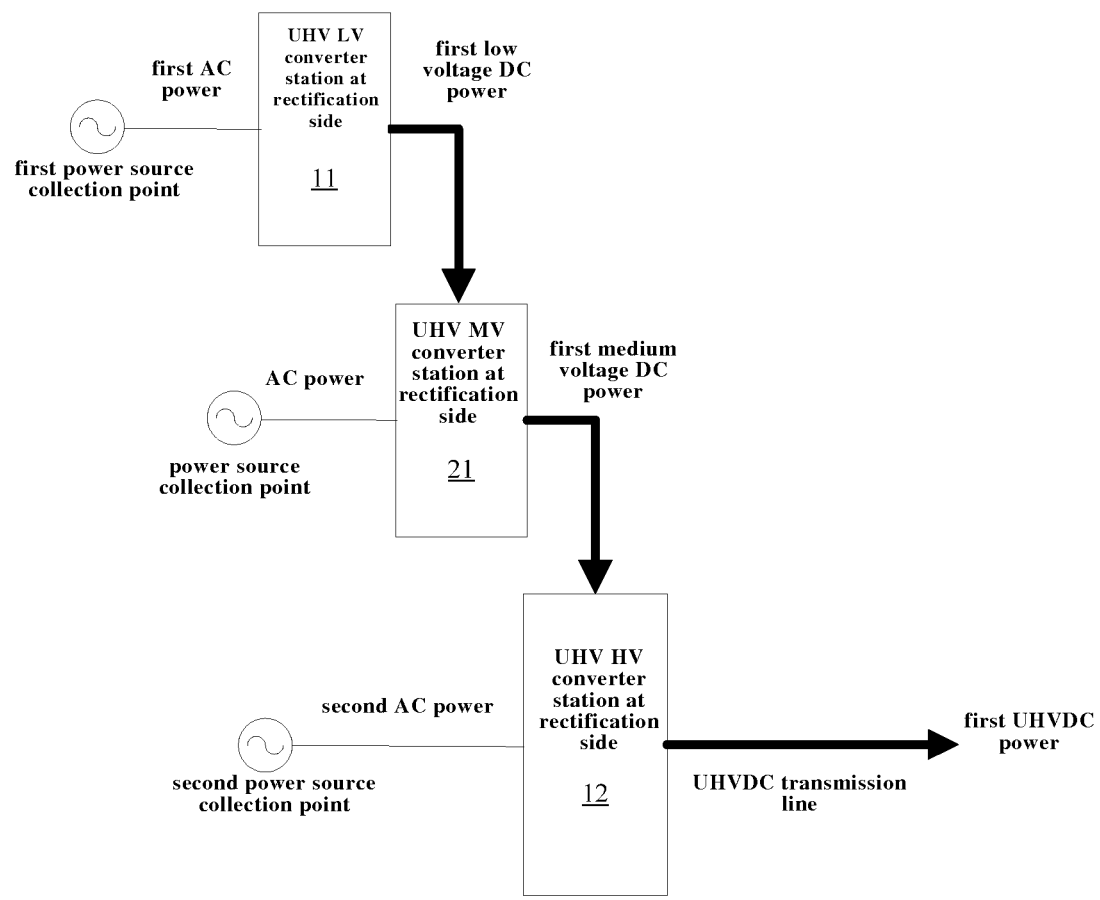
FIG. 6 shows structure and connection diagram according to the second embodiment of the UHV converter station at rectification side of the present invention.

FIG. 6 shows structure and connection diagram according to the second embodiment of the UHV converter station at rectification side of the present invention.

As shown in FIG. 6, in comparison with the first embodiment of the UHV converter station at rectification side, the UHV converter station at rectification side of this embodiment further includes an UHV MV(medium voltage) converter station at rectification side 21 between the UHV LV(low voltage) converter station at rectification side 11 and the UHV HV(high voltage) converter station at rectification side 12, wherein the UHV MV(medium voltage) converter station at rectification side 21 is used for receiving an AC power and the first low voltage DC power output from the UHV LV(low voltage) converter station at rectification side 11, rectifying the AC power and superimposing it with the first low voltage DC power to generate a first medium voltage DC power and inputting the first medium voltage DC power into the UHV HV(high voltage) converter station at rectification side.

Specifically, the UHV MV(medium voltage) converter station at rectification side 21 comprises:

a fifth power source input module for receiving the AC power from a corresponding power source collection point, and transmitting it to a fifth power source conversion module;

the fifth power source conversion module for rectifying the AC power and superimposing it with the input DC power, and outputting the superimposed DC power.

Figure 7:
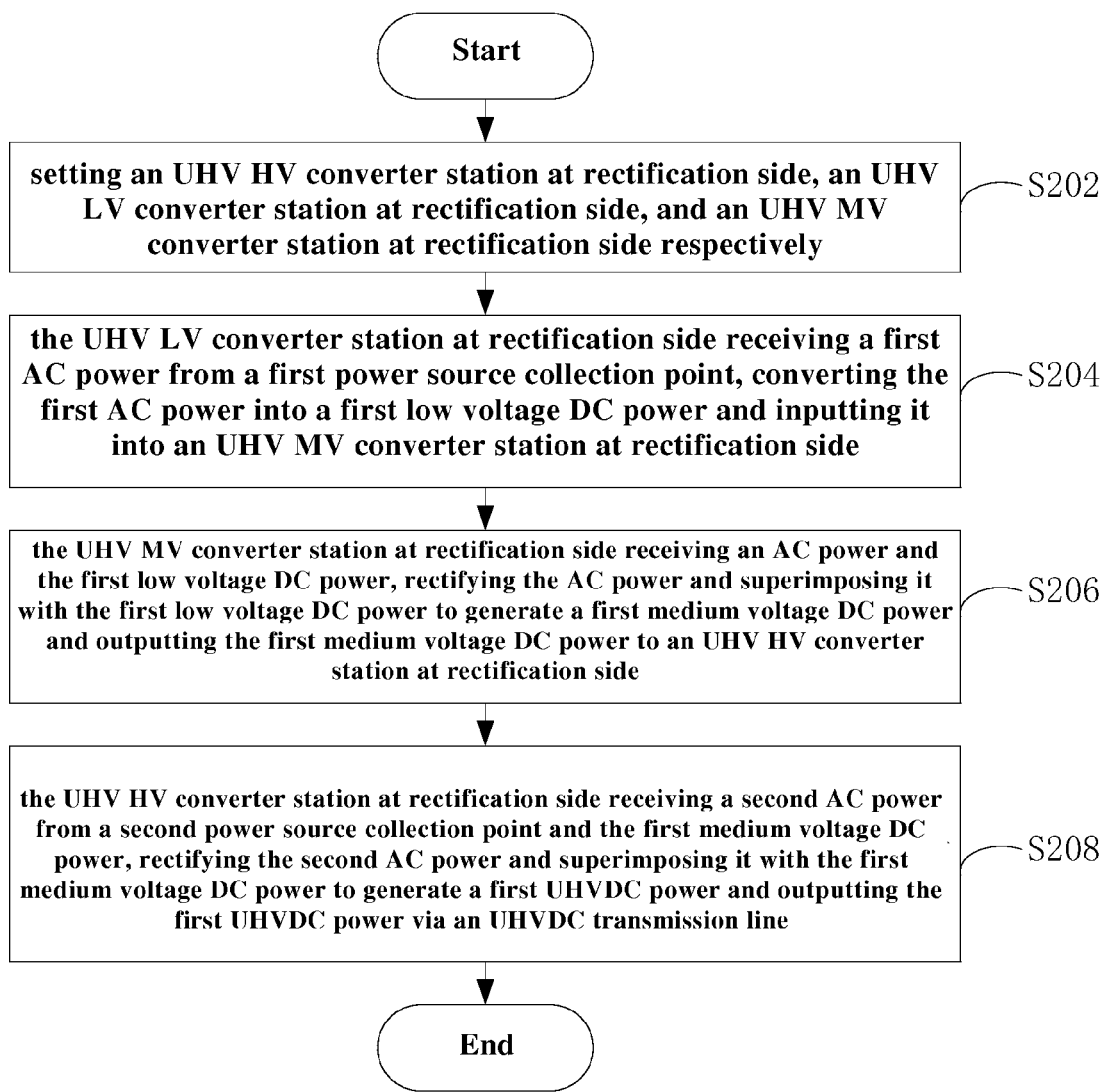
FIG. 7 shows a flow chart of the connection method of the UHV converter station at rectification side according to the second embodiment as shown in FIG. 6.

FIG. 7 shows a flow chart of the connection method of the UHV converter station at rectification side according to the second embodiment as shown in FIG. 6.

As shown in FIG. 7, this embodiment may comprise the following steps:

S202: setting an UHV HV(high voltage) converter station at rectification side, an UHV LV(low voltage) converter station at rectification side, and an UHV MV(medium voltage) converter station at rectification side respectively;

S204: the UHV LV(low voltage) converter station at rectification side receiving a first AC power from a first power source collection point, converting the first AC power into a first low voltage DC power and inputting it into an UHV MV(medium voltage) converter station at rectification side;

S206: the UHV MV(medium voltage) converter station at rectification side receiving an AC power and the first low voltage DC power, rectifying the AC power and superimposing it with the first low voltage DC power to generate a first medium voltage DC power and outputting the first medium voltage DC power to an UHV HV(high voltage) converter station at rectification side;

S208: the UHV HV(high voltage) converter station at rectification side receiving a second AC power from a second power source collection point and the first medium voltage DC power, rectifying the second AC power and superimposing it with the first medium voltage DC power to generate a first UHVDC power and outputting the first UHVDC power via an UHVDC transmission line.

Wherein, the voltage of the first UHVDC power may be above ±750 KV. For example, the voltage of the first UHV DC power is ±1000 KV or ±1200 KV.

When the voltage of the first UHVDC power is ±1000 KV, the voltage of the first low voltage DC power may be in a range of 300 KV-600 KV. Optionally, in a symmetric case, the voltage of the first low voltage DC power is ⅓ of that of the first UHVDC power, i.e., 333.3 KV; in an asymmetric case, the voltage of the first low voltage DC power may be 400 KV. The voltage of the first medium voltage DC power may be in a range of 600 KV-900 KV. Optionally, in a symmetric case, the voltage of the first medium voltage DC power is ⅔ of that of the first UHVDC power, i.e., 666.6 KV; and in an asymmetric case, the voltage of the first medium voltage DC power can be 800 KV.

Take the above superimposing process as an example, if the voltage of the first low voltage DC power is 400 KV, and the voltage of the rectified AC power input to the UHV MV(medium voltage) converter station at rectification side is 400 KV, then the voltage of the first medium voltage DC power is 800 KV. If the voltage of the rectified second AC power is 200 KV, then the first UHVDC power obtained by superimposing it with the first medium voltage DC power is 1000 KV.

When the voltage of the first UHVDC power is ±1200 KV, in the symmetric case, the voltage of the first low voltage DC power is 400 KV, and the voltage of the first medium voltage DC power is 800 KV; and in the asymmetric case, the voltage of the first low voltage DC power may be 500 KV, and the voltage of the first medium voltage DC power may be 1000 KV.

When the above symmetric arrangement is employed, the output power of the electric grid can be effectively guaranteed.

The above first and second AC power can both include one or more AC loops, the voltage of which and its determination principle are the same as that in the prior art, and will not be described in detail herein.

The number of the UHV MV(medium voltage) converter station at rectification side may be one or more.

Figure 8:
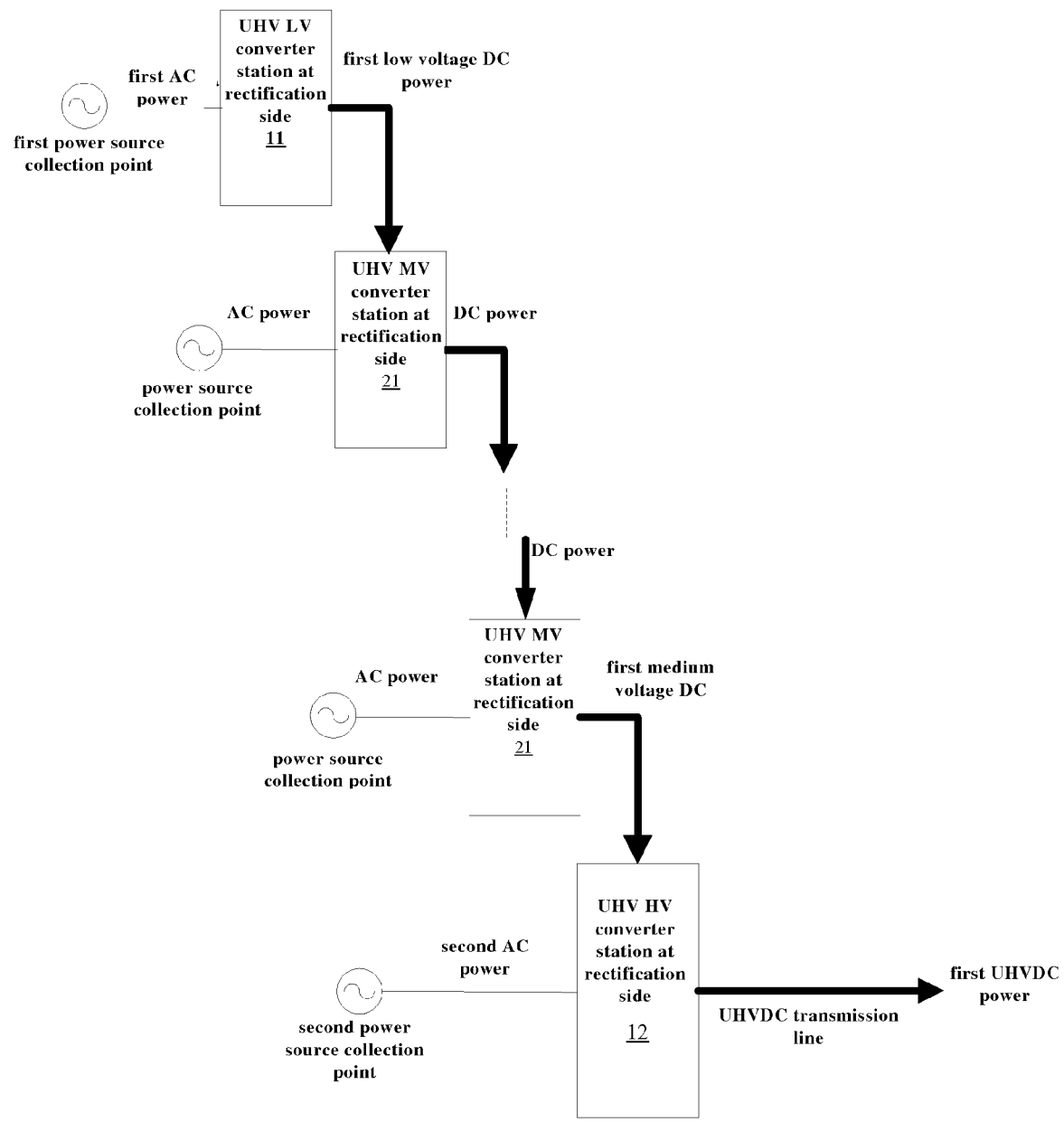
FIG. 8 shows a connection diagram of the UHV converter station at rectification side of the present invention comprising two or more UHV MV(medium voltage) converter stations at rectification side.

When there are two or more UHV MV(medium voltage) converter stations at rectification side, as shown in FIG. 8, the two or more UHV MV(medium voltage) converter stations at rectification side are cascaded sequentially. In such a case, each of the UHV MV(medium voltage) converter stations at rectification side among the two or more UHV MV(medium voltage) converter stations at rectification receives a corresponding AC power and the input DC power, rectifies the corresponding AC power and superimposes it with the input DC power, and outputs the superimposed DC power.

It is necessary to explain that, the UHV HV(high voltage) converter station at rectification side may comprise one HV(high voltage) valve hall or two HV(high voltage) valve halls with different polarities; the UHV LV(low voltage) converter station at rectification side can comprise one LV(low voltage) valve hall or two LV(low voltage) valve halls with different polarities; and the UHV MV(medium voltage) converter station at rectification side can comprise one MV(medium voltage) valve hall or two MV(medium voltage) valve halls with different polarities.

When the UHV HV(high voltage) converter station at rectification side comprises two HV(high voltage) valve halls with different polarities, the two HV(high voltage) valve halls with different polarities may be located at different locations; at this time, the two LV(low voltage) valve halls in the UHV LV(low voltage) converter station at rectification side may be located at the same location or different locations, and the two MV(medium voltage) valve halls in the UHV MV(medium voltage) converter station at rectification side may be located at the same location or different locations.

When the UHV LV(low voltage) converter station at rectification side comprises two LV(low voltage) valve halls with different polarities, the two LV(low voltage) valve halls with different polarities may be located at different locations; at this time, the two HV(high voltage) valve halls in the UHV HV(high voltage) converter station at rectification side may be located at the same location or different locations, and the two MV(medium voltage) valve halls in the UHV MV(medium voltage) converter station at rectification side may be located at the same location or different locations.

When the UHV MV(medium voltage) converter station at rectification side comprises two MV(medium voltage) valve halls with different polarities, the two MV(medium voltage) valve halls with different polarities may be located at different locations; at this time, the two HV(high voltage) valve halls in the UHV HV(high voltage) converter station at rectification side may be located at the same location or different locations, and the two LV(low voltage) valve halls in the UHV LV(low voltage) converter station at rectification side may be located at the same location or different locations.

Figure 1:
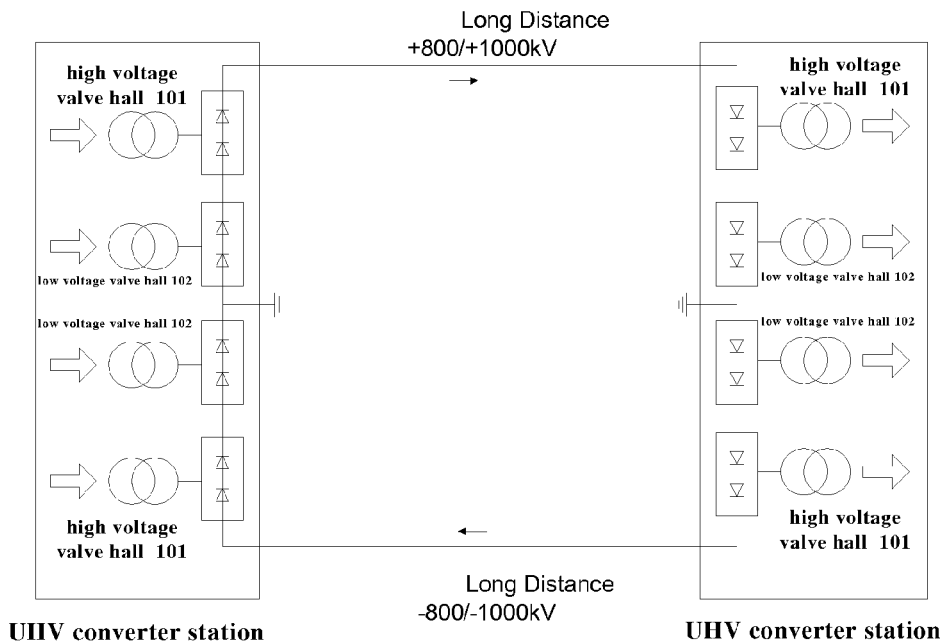
FIG. 1 shows an existing conventional arrangement of UHV converter station.
Figure 2:
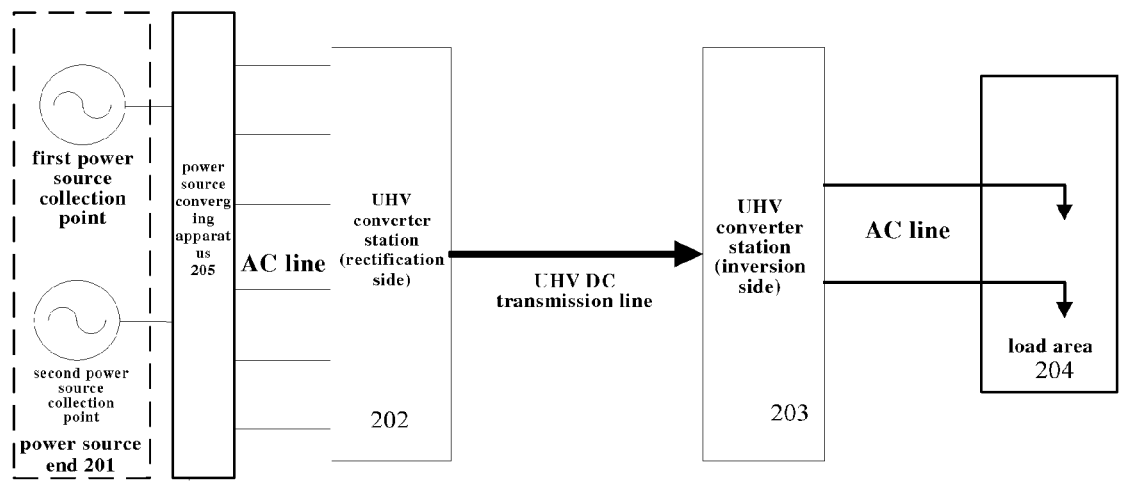
FIG. 2 shows a power transmission scheme in the prior art.

With application of the above embodiments, the UHV HV(high voltage) converter station at rectification side and the UHV LV(low voltage) converter station at rectification side are set at different physical locations respectively, so that the first power source collection point in the power source end can transmit directly power to the UHV LV(low voltage) converter station, and the second power source collection point in the power source end can transmit directly power to the UHV HV(high voltage) converter station. It is unnecessary to converge power sources of the first and second power source collection point, that is, the power source converging apparatus 205 in FIG. 2 is no longer needed. Therefore, the number of the loops of the AC lines between the first power source collection point, the second power source collection point and the UHV converter station at rectification side is reduced, the transmission cost and loss are reduced, and better economic benefit can be obtained. In addition, the manner of setting the UHV HV(high voltage) and LV(low voltage) converter stations at rectification side at different physical locations respectively solves the problem of difficult transportation of the HV(high voltage) transformer. Therefore, construction cost is greatly reduced, and the cost for transportation is reduced.

Since an UHV MV(medium voltage) converter station at rectification side is introduced, the above second embodiment at rectification side, in comparison with the first embodiment, makes the UHV HV(high voltage) converter station of the second embodiment be able to output a first UHVDC power higher than that of the first embodiment. At the same time, in comparison with the first embodiment, the second embodiment can collect more dispersed AC power sources more conveniently.

Figure 9:
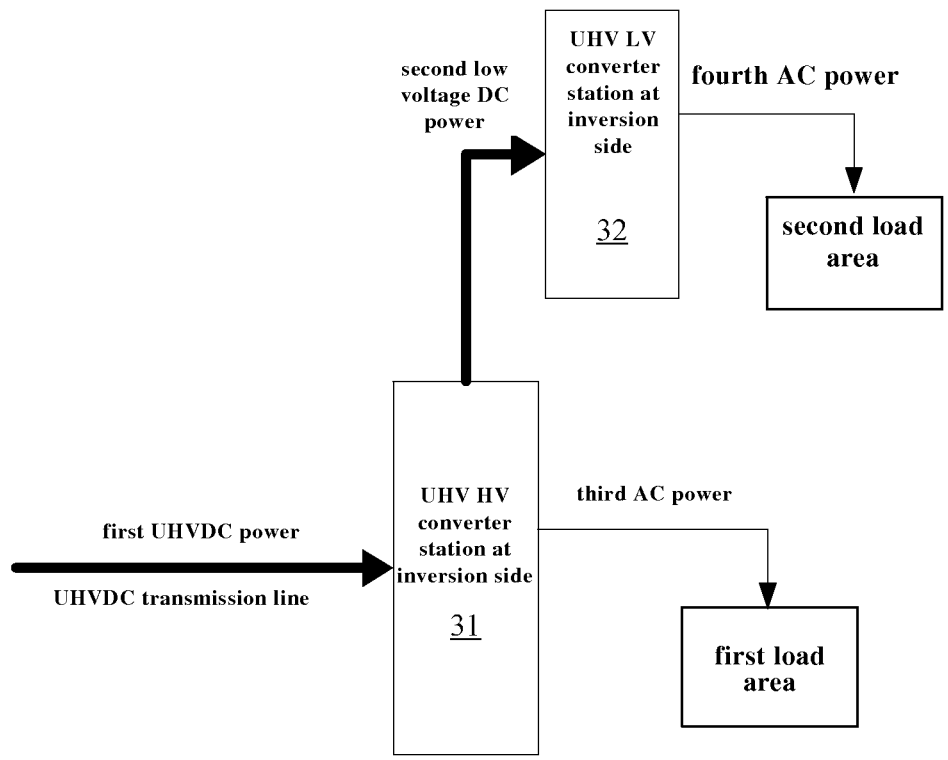
FIG. 9 shows structure and connection diagram according to the first embodiment of the UHV converter station at inversion side of the present invention.

FIG. 9 shows structure and connection diagram according to the first embodiment of an UHV converter station at inversion side of the present invention.

As shown in FIG. 9, the UHV converter station at inversion side of this embodiment comprises:

an UHV HV(high voltage) converter station at inversion side 31 for inputting a first UHVDC power via an UHVDC transmission line, outputting a third AC power and a second low voltage DC power, and transmitting the third AC power to a first load area;

an UHV LV(low voltage) converter station at inversion side 32 for converting the second low voltage DC power into a fourth AC power and transmitting it to a second load area.

Specifically, the UHV HV(high voltage) converter station at inversion side 31 may comprise:

a fourth power source input module for receiving the first UHVDC power via the UHVDC transmission line and transmitting it to a fourth power source conversion module;

the fourth power source conversion module for receiving the first UHVDC power, outputting the third AC power and the second low voltage DC power, transmitting the third AC power to the first load area, and transmitting the second low voltage DC power to the UHV LV(low voltage) converter station at inversion side.

The UHV LV(low voltage) converter station at inversion side 32 comprises:

a third power source input module for receiving the second low voltage DC power and transmitting it to a third power source conversion module;

the third power source conversion module for converting the second low voltage DC power into the fourth AC power, and transmitting it to the second load area.

Figure 10:
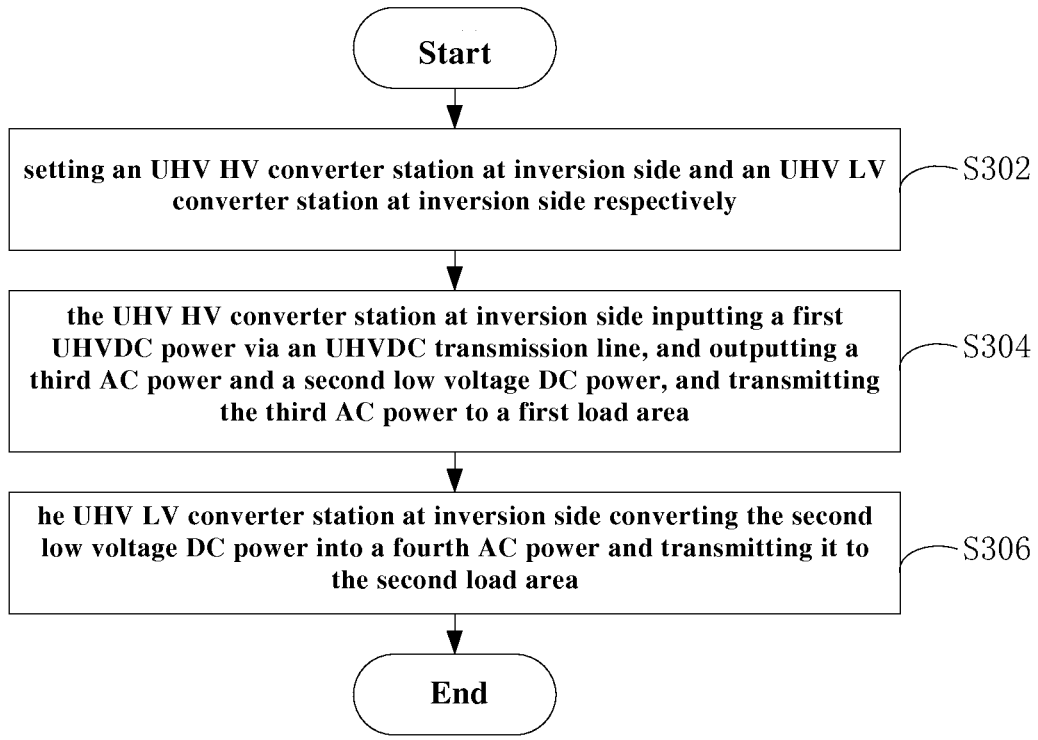
FIG. 10 shows a flow chart of the connection method of the UHV converter station at inversion side according to the first embodiment as shown in FIG. 9.

FIG. 10 shows a flow chart of the connection method of the UHV converter station at inversion side according to the first embodiment as shown in FIG. 9.

As shown in FIG. 10, this embodiment may comprise the following steps:

S302: setting an UHV HV(high voltage) converter station at inversion side and an UHV LV(low voltage) converter station at inversion side respectively. That is, the two converter stations are set at different physical locations respectively;

S304: the UHV HV(high voltage) converter station at inversion side inputting a first UHVDC power via an UHVDC transmission line, and outputting a third AC power and a second low voltage DC power, and transmitting the third AC power to a first load area;

S306: the UHV LV(low voltage) converter station at inversion side converting the second low voltage DC power into a fourth AC power and transmitting it to the second load area.

Wherein, the above first and second load areas may be physically different load areas.

Wherein, the voltage of the first UHVDC power may be above ±750 KV. For example, the voltage of the first UHVDC power is ±800 KV or ±1000 KV.

When the voltage of the first UHVDC power is ±800 KV, the voltage of the second low voltage DC power may be in a range of 300 KV-660 KV. Preferably, the voltage of the second low voltage DC power is half of that of the first UHVDC power, i.e., 400 KV.

It is necessary to explain that, the above third and fourth AC power can both include one or more AC line(s), the specific number of which can be determined based on the number and requirement of the load ends, wherein each load area may correspond to one or more AC line(s). The determination method is prior art, and thus will not be described in detail herein.

It is necessary to explain that, the voltage of the respective AC lines in the above third and fourth AC power can be determined based on the specific requirement of the load ends, and the determination process is prior art, and thus will not be described in detail herein.

It is necessary to explain that, the above UHV HV(high voltage) converter station at inversion side may comprise one HV(high voltage) valve hall or two HV(high voltage) valve halls with different polarities. That is, one UHV HV(high voltage) converter station at inversion side may consist of one or two HV(high voltage) valve hall(s). Correspondingly, the UHV LV(low voltage) converter station at inversion side may comprise one LV(low voltage) valve hall or two LV(low voltage) valve halls with different polarities.

When the UHV HV(high voltage) converter station at inversion side comprises two HV(high voltage) valve halls with different polarities, the two HV(high voltage) valve halls with different polarities may be located at different locations. At this time, the two LV(low voltage) valve halls in the UHV LV(low voltage) converter station at inversion side may be located at the same location or different locations.

When the UHV LV(low voltage) converter station at inversion side comprises two LV(low voltage) valve halls with different polarities, the two LV(low voltage) valve halls with different polarities may be located at different locations. At this time, the two HV(high voltage) valve halls in the UHV HV(high voltage) converter station at inversion side may be located at the same location or different locations.

Figure 11:
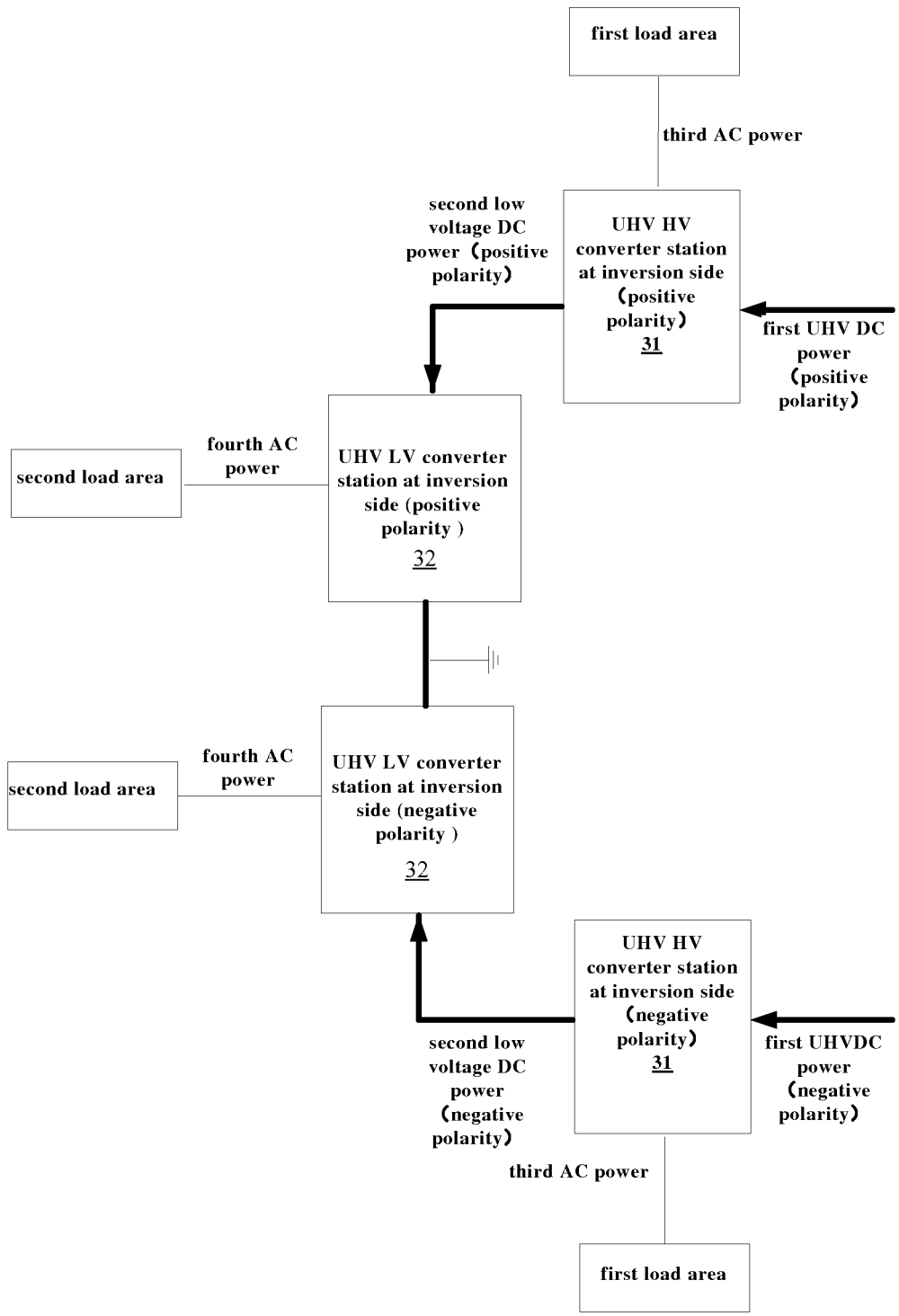
FIG. 11 shows a connection diagram of the UHV converter station at inversion side of the present invention, wherein the high and LV(low voltage) valve halls are at different locations.

FIG. 11 shows the case where the two HV(high voltage) valve halls of the UHV HV(high voltage) converter station at inversion side are located at different locations, and the two LV(low voltage) valve halls of the UHV LV(low voltage) converter station at inversion side are also located at different locations.

Figure 12:
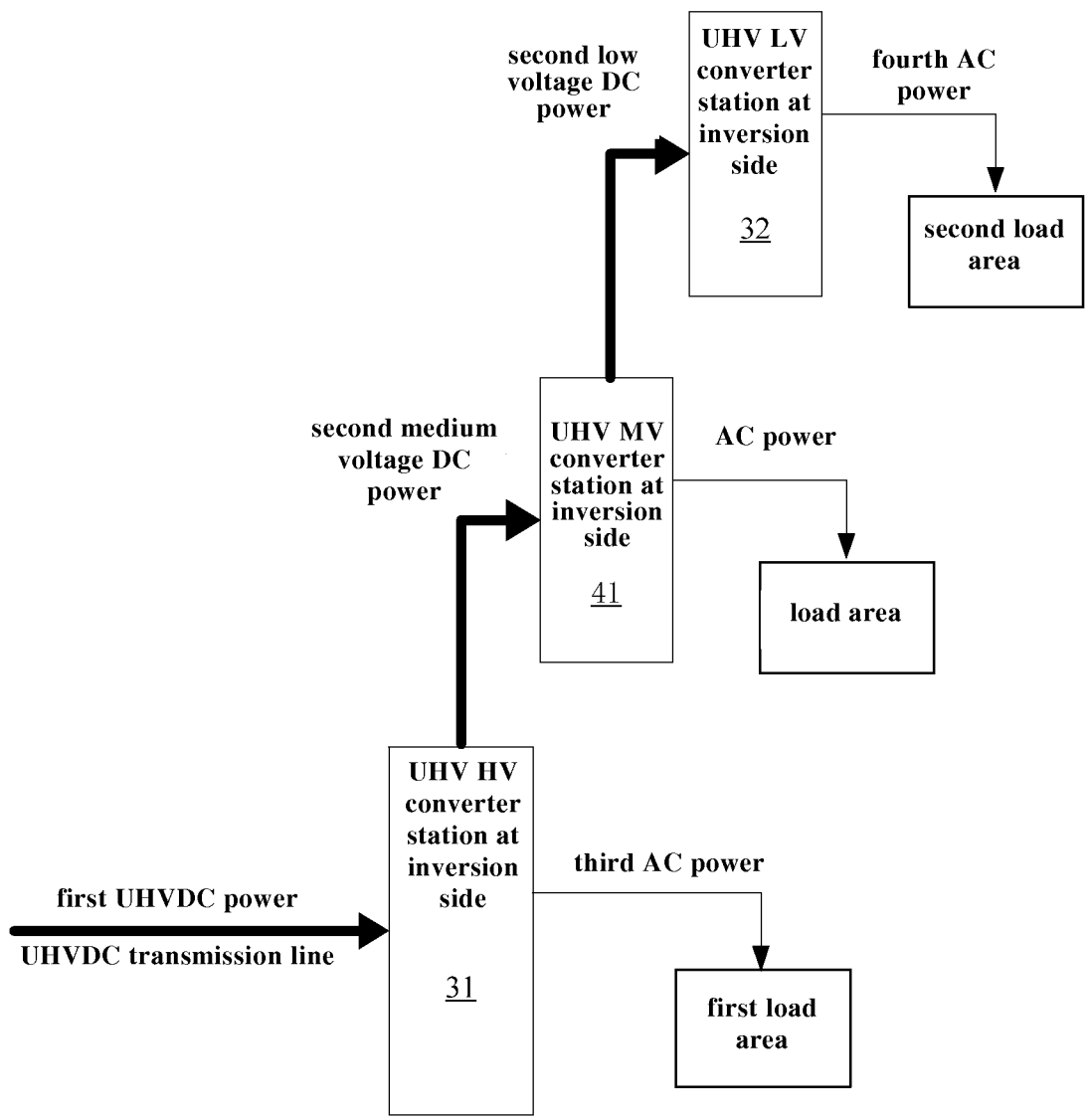
FIG. 12 shows structure and connection diagram according to the second embodiment of the UHV converter station at inversion side of the present invention.

FIG. 12 shows structure and connection diagram according to the second embodiment of the UHV converter station at inversion side of the present invention.

As shown in FIG. 12, in comparison with the first embodiment of the UHV converter station at inversion side, the UHV converter station at inversion side of this embodiment further includes an UHV MV(medium voltage) converter station at inversion side 41 between the UHV HV(high voltage) converter station at inversion side 31 and the UHV LV(low voltage) converter station at inversion side 32 and, wherein the UHV MV(medium voltage) converter station at inversion side 41 is used for receiving a second medium voltage DC power output from the UHV HV(high voltage) converter station at inversion side, outputting an AC power and the second low voltage DC power, and transmitting the second low voltage DC power to the UHV LV(low voltage) converter station at inversion side 32, and transmitting the output AC power to a corresponding load area.

Specifically, the UHV MV(medium voltage) converter station at inversion side 41 may comprise:

a sixth power source input module for receiving the input DC power and transmitting it to a sixth power source conversion module;

the sixth power source conversion module for receiving the input DC power and outputting an AC power and a DC power and transmitting the output AC power to a corresponding load area.

Figure 13:
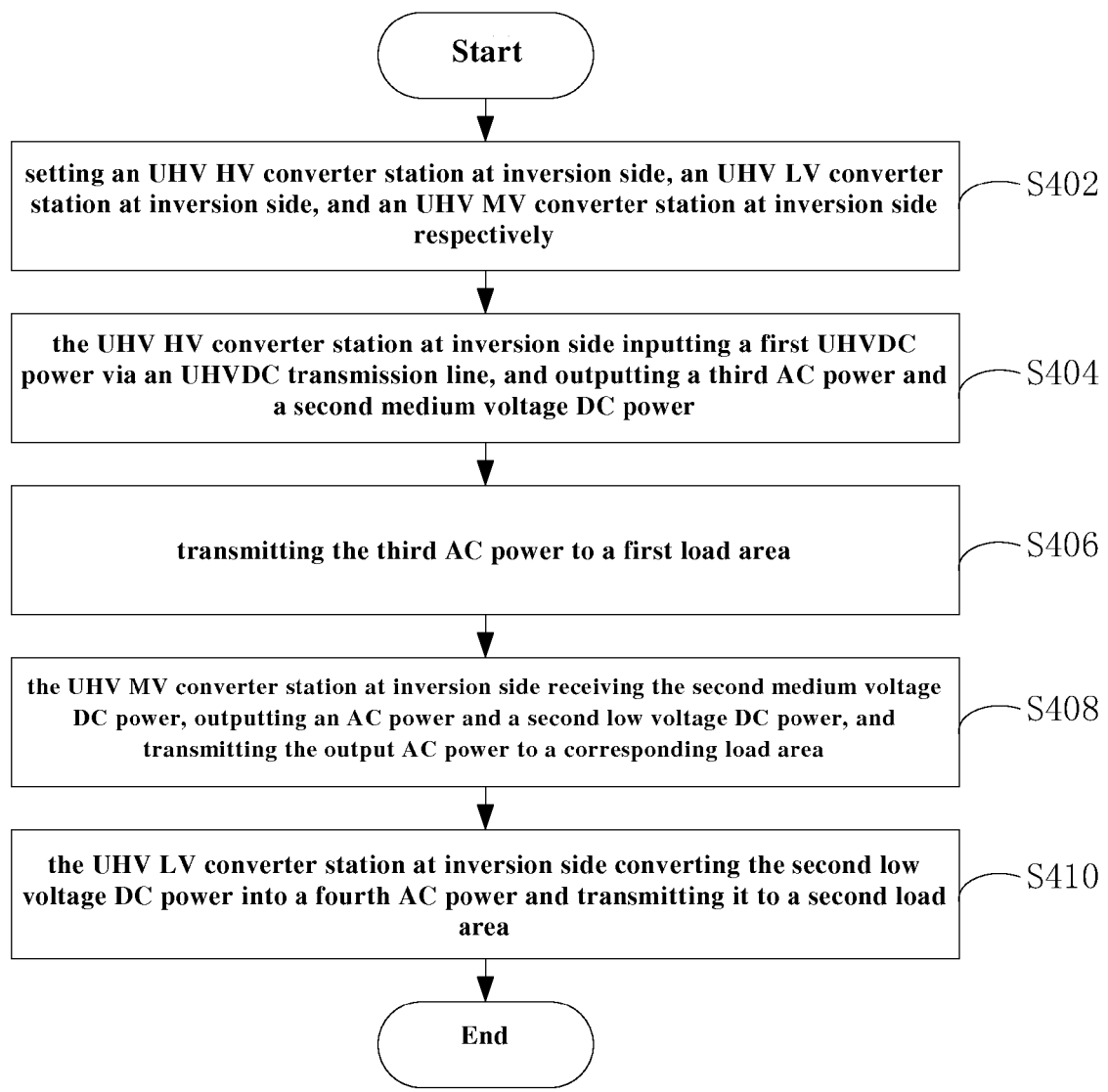
FIG. 13 shows a flow chart of the connection method of the UHV converter station at inversion side according to the second embodiment as shown in FIG. 12.

FIG. 13 shows a flow chart of the connection method of the UHV converter station at inversion side according to the second embodiment as shown in FIG. 12.

As shown in FIG. 13, this embodiment may comprise the following steps:

S402: setting an UHV HV(high voltage) converter station at inversion side, an UHV LV(low voltage) converter station at inversion side, and an UHV MV(medium voltage) converter station at inversion side respectively;

S404: the UHV HV(high voltage) converter station at inversion side inputting a first UHVDC power via an UHVDC transmission line, and outputting a third AC power and a second medium voltage DC power;

S406: transmitting the third AC power to a first load area;

S408: the UHV MV(medium voltage) converter station at inversion side receiving the second medium voltage DC power, outputting an AC power and a second low voltage DC power, and transmitting the output AC power to a corresponding load area;

S410: the UHV LV(low voltage) converter station at inversion side converting the second low voltage DC power into a fourth AC power and transmitting it to a second load area.

Wherein, the first load area, the second load area, and the corresponding load area may be physically different load areas.

Wherein, the voltage of the first UHVDC power may be above ±750 KV. For example, the voltage of the first UHVDC power is ±1000 KV or ±1200 KV.

When the voltage of the first UHVDC power is ±1000 KV, the voltage of the second medium voltage DC power may be in a range of 600 KV-900 KV. Optionally, in a symmetric case, the voltage of the second medium voltage DC power is ⅔ of that of the first UHVDC power, i.e., 666.6 KV; in an asymmetric case, the voltage of the second medium voltage DC power may be 800 KV. The voltage of the second low voltage DC power may be in a range of 300 KV-600 KV. Optionally, in a symmetric case, the voltage of the second low voltage DC power is ⅓ of that of the first UHVDC power, i.e., 333.3 KV; and in an asymmetric case, the voltage of the second low voltage DC power may be 400 KV.

In the asymmetric case, taking the above power distribution process as an example, if the voltage of the first UHVDC power is 1000 KV, and the voltage transmitted to the first load area is 200 KV, then the voltage of the second medium voltage DC power is 800 KV. If the voltage transmitted to the load area corresponding to the UHV MV(medium voltage) converter station at inversion is 400 KV, then the second low voltage DC power is 400 KV.

When the voltage of the first UHVDC power is ±1200 KV, in the symmetric case, the voltage of the second medium voltage DC power is 800 KV, and the voltage of the second low voltage DC power is 400 KV; and in the asymmetric case, the voltage of the second medium voltage DC power is 1000 KV, and the voltage of the second low voltage DC power is 500 KV.

When the above symmetric arrangement is employed, the output power of the electric grid can be effectively guaranteed.

Figure 14:
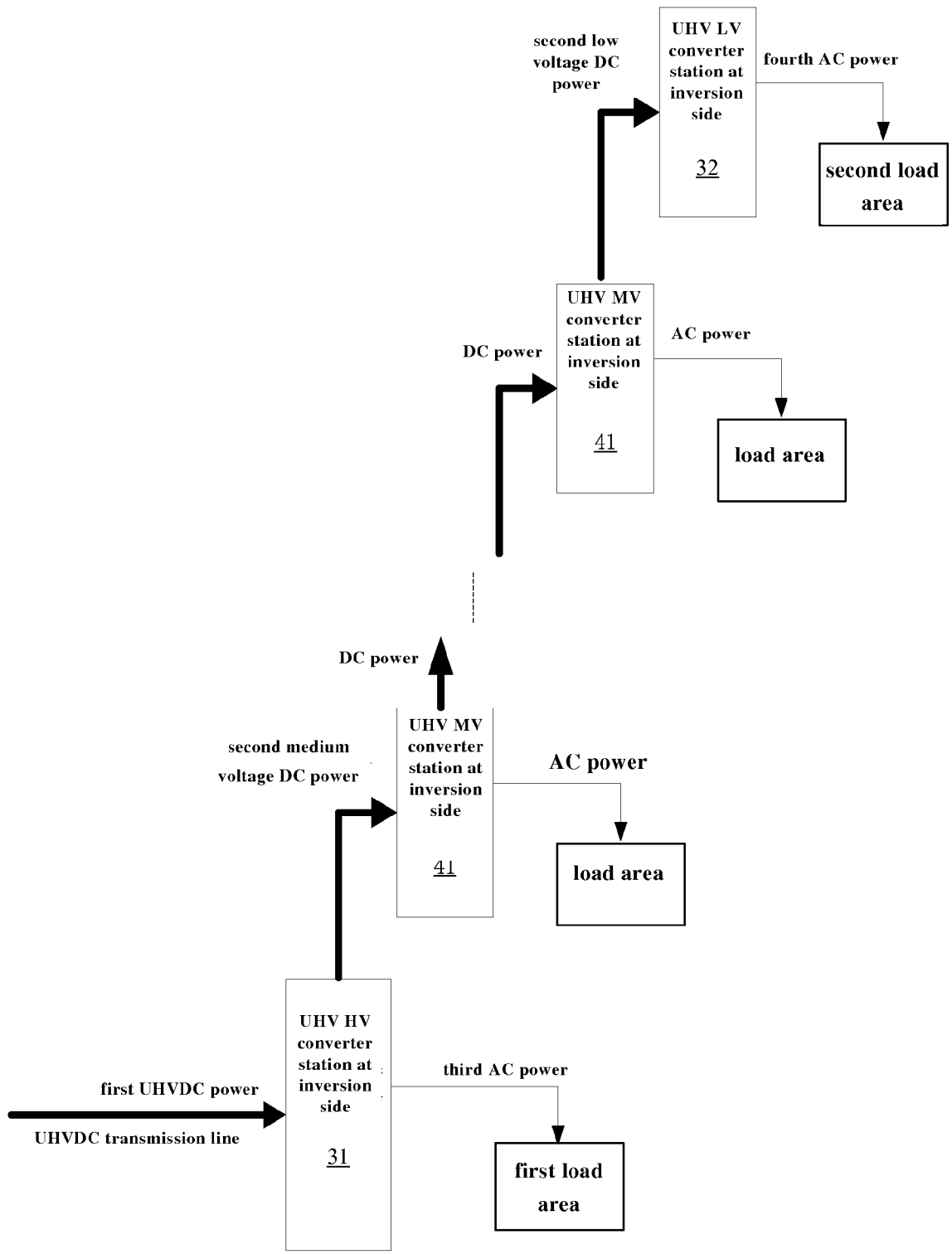
FIG. 14 shows a connection diagram of the UHV converter station at inversion side of the present invention comprising two or more UHV MV(medium voltage) converter stations at inversion side.

The number of the UHV MV(medium voltage) converter station at inversion side may be one or more. When there are two or more UHV MV(medium voltage) converter stations at inversion side, as shown in FIG. 14, the two or more UHV MV(medium voltage) converter stations at inversion side are cascaded sequentially, wherein each UHV MV(medium voltage) converter station at inversion side of the two or more UHV MV(medium voltage) converter stations at inversion side receives the input DC power, and outputs the corresponding AC power and DC power.

It is necessary to explain that, the UHV HV(high voltage) converter station at inversion side may comprise one HV(high voltage) valve hall or two HV(high voltage) valve halls with different polarities; the UHV LV(low voltage) converter station at inversion side may comprise one LV(low voltage) valve hall or two LV(low voltage) valve halls with different polarities; the UHV MV(medium voltage) converter station at inversion side can comprise one MV(medium voltage) valve hall or two MV(medium voltage) valve halls with different polarities.

When the UHV HV(high voltage) converter station at inversion side comprises two HV(high voltage) valve halls with different polarities, the two HV(high voltage) valve halls with different polarities can be located at different locations. At the same time, the two LV(low voltage) valve halls in the UHV LV(low voltage) converter at inversion side can be located at the same location or different locations, and the two MV(medium voltage) valve halls in the UHV MV(medium voltage) converter station at inversion side can be located at the same location or different locations.

When the UHV LV(low voltage) converter station at inversion side comprises two LV(low voltage) valve halls with different polarities, the two LV(low voltage) valve halls with different polarities can be located at different locations. At the same time, the two HV(high voltage) valve halls in the UHV HV(high voltage) converter at inversion side can be located at the same location or different locations, and the two MV(medium voltage) valve halls in the UHV MV(medium voltage) converter station at inversion side can be located at the same location or different locations.

When the UHV MV(medium voltage) converter station at inversion side comprises two MV(medium voltage) valve halls with different polarities, the two MV(medium voltage) valve halls with different polarities can be located at different locations. At the same time, the two HV(high voltage) valve halls in the UHV HV(high voltage) converter at inversion side can be located at the same location or different locations, and the two LV(low voltage) valve halls in the UHV LV(low voltage) converter station at inversion side can be located at the same location or different locations.

With the application of the above embodiments, since the UHV HV(high voltage) converter station at inversion side and the UHV LV(low voltage) converter station at inversion side are set at different physical locations respectively, the UHV LV(low voltage) converter station at inversion side may stretch to the load end to shorten the distance between the converter station and the load end, thereby the transmission cost and loss between the UHV converter station at inversion side and the load are reduced. Moreover, since the UHV LV(low voltage) converter station at inversion side and UHV HV(high voltage) converter station are constructed separately (that is, can be located at different physical locations), distribution of the load is dispersed, which facilitates power supply to the users.

It is necessary to explain that, in comparison with the first embodiment, this second embodiment at inversion side includes at least one UHV MV(medium voltage) converter station at inversion side, which makes the second embodiment be able to provide power to the multiple load areas more conveniently and meanwhile makes the security stability of the electric grid better.

It is necessary to explain that, the embodiments related to FIGS. 3-8 are improvement on rectification side, and the embodiments related to FIGS. 9-14 are improvement on inversion side. The object of reducing transmission cost and loss can be achieved by applying only one of them, and if they are both applied, the beneficial effect will be more significant. In the present invention, it is not defined specifically to apply one of them or both of them.

Figure 15:
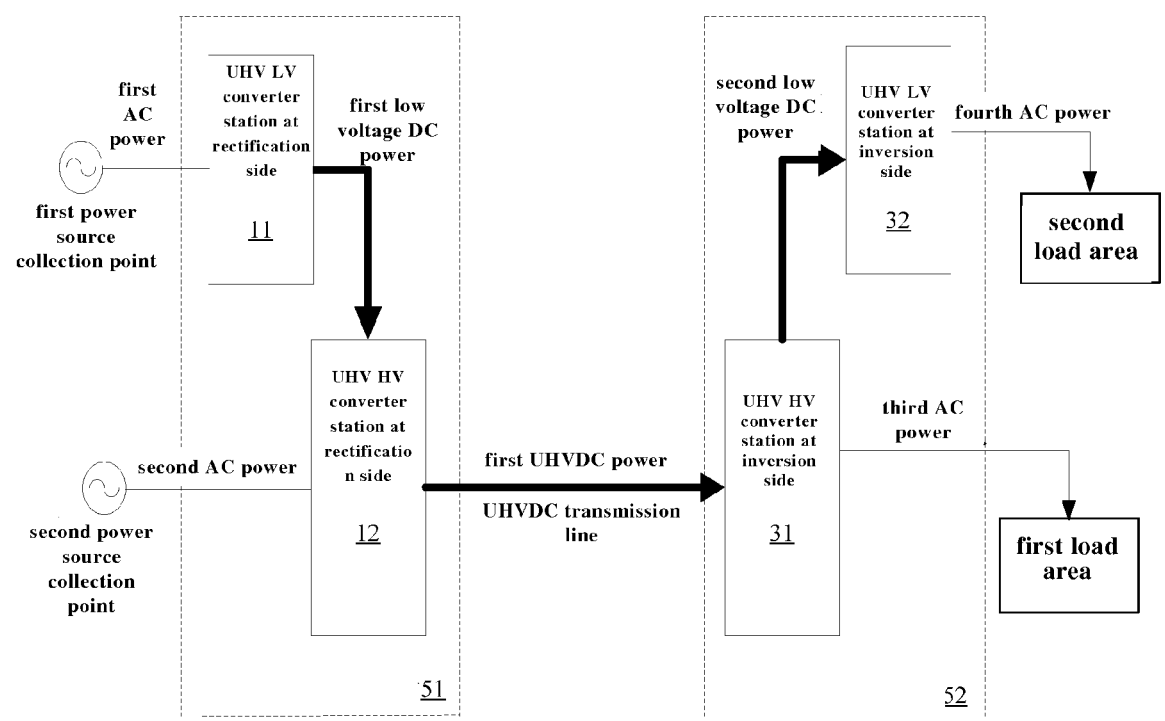
FIG. 15 shows structure and connection diagram according to the first embodiment of the UHVDC transmission system of the present invention.

FIG. 15 shows structure and connection diagram according to the first embodiment of an UHVDC transmission system of the present invention.

As shown in FIG. 15, the UHVDC transmission system of this embodiment comprises the UHV converter station at rectification side 51 of the embodiment shown in FIG. 3 (specifically including the UHV LV(low voltage) converter station at rectification side 11 and the UHV HV(high voltage) converter station at rectification side 12, which are connected to each other), and the UHV converter station at inversion side 52 of the embodiment shown in FIG. 9 (specifically including the UHV HV(high voltage) converter station at inversion side 31 and the UHV LV(low voltage) converter station at inversion side 32, which are connected to each other). In the UHVDC transmission system, the UHV HV(high voltage) converter station at rectification side in the UHV converter station at rectification side is connected to the UHV HV(high voltage) converter station at inversion side in the UHV converter station at inversion side via the UHVDC transmission line.

Figure 16:
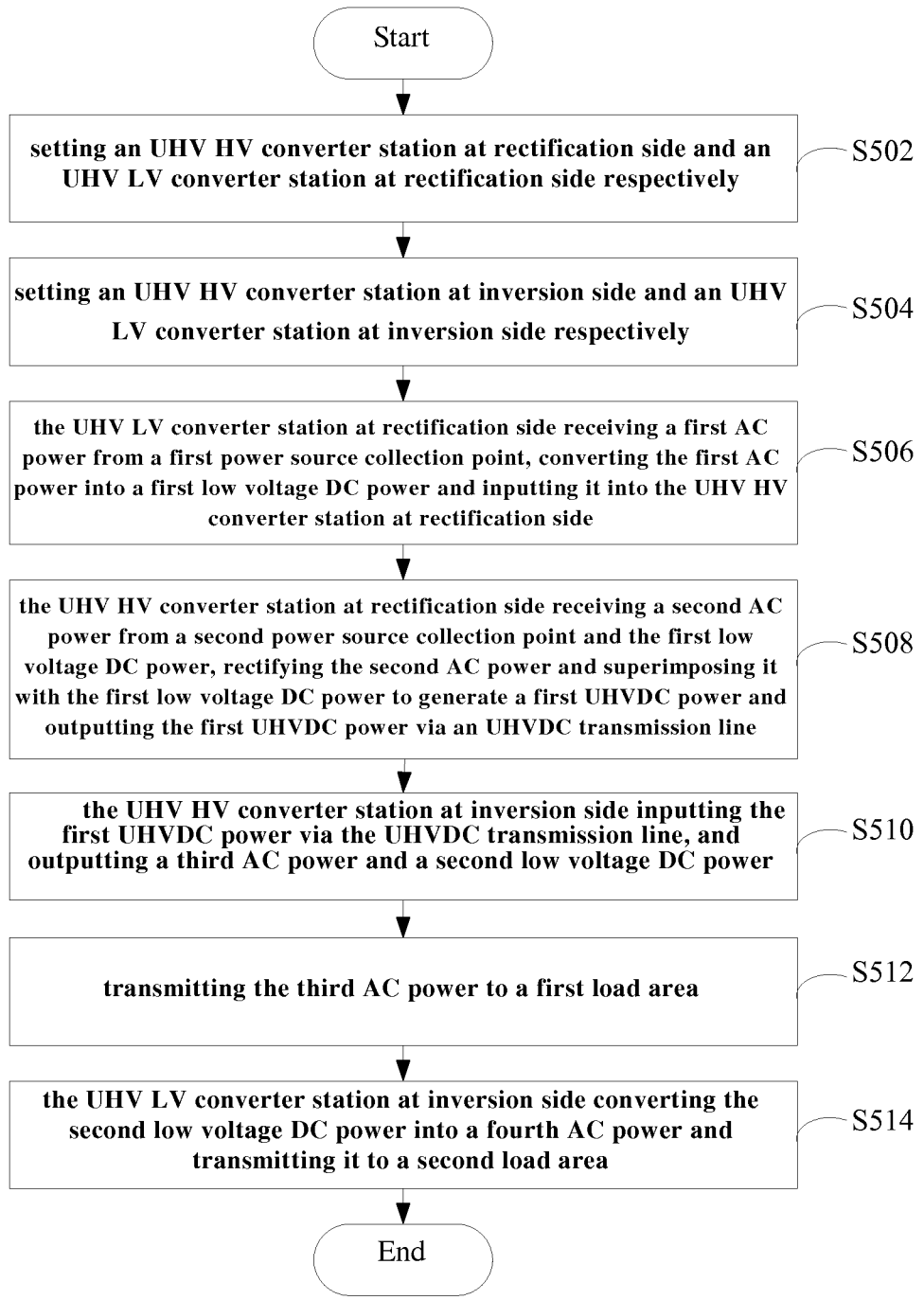
FIG. 16 shows a flow chart of the connection method of the UHVDC transmission system according to the first embodiment as shown in FIG. 15.

FIG. 16 shows a flow chart of the connection method of the UHVDC transmission system according to the first embodiment as shown in FIG. 15.

As shown in FIG. 16, this embodiment comprises the following steps:

S502: setting an UHV HV(high voltage) converter station at rectification side and an UHV LV(low voltage) converter station at rectification side respectively. That is, they can be set at different physical locations respectively to reduce the number of the loops of the AC lines into the UHV converter station at rectification side as much as possible;

S504: setting an UHV HV(high voltage) converter station at inversion side and an UHV LV(low voltage) converter station at inversion side respectively. That is, they can be set at different physical locations respectively to facilitate supplying electric energy to the load end;

S506: the UHV LV(low voltage) converter station at rectification side receiving a first AC power from a first power source collection point, converting the first AC power into a first low voltage DC power and inputting it into the UHV HV(high voltage) converter station at rectification side;

S508: the UHV HV(high voltage) converter station at rectification side receiving a second AC power from a second power source collection point and the first low voltage DC power, rectifying the second AC power and superimposing it with the first low voltage DC power to generate a first UHVDC power and outputting the first UHVDC power via an UHVDC transmission line;

S510: the UHV HV(high voltage) converter station at inversion side inputting the first UHVDC power via the UHVDC transmission line, and outputting a third AC power and a second low voltage DC power;

S512: transmitting the third AC power to a first load area;

S514: the UHV LV(low voltage) converter station at inversion side converting the second low voltage DC power into a fourth AC power and transmitting it to a second load area.

In the above process, the above first and second load areas may be physically different load areas.

The voltage of the first UHVDC power may be above ±750 KV. For example, the voltage of the first UHVDC power is ±800 KV or ±1000 KV.

When the voltage of the first UHV DC power is ±800 KV, the voltage of the first low voltage DC power may be in a range of 300 KV-660 KV, and preferably, the voltage of the first low voltage DC power is half of that of the first UHVDC power, i.e., 400 KV; the voltage of the second low voltage DC power may be in a range of 300 KV-660 KV, and preferably, the voltage of the second low voltage DC power is half of that of the first UHVDC power, i.e., 400 KV The above first and second AC power can both include one or more AC loops, the specific voltage of which and its determination principle are the same as that in the prior art, and thus will not be described in detail herein. The above third and fourth AC power can both include one or more AC loops, the specific number of which can be determined based on the number and requirement of the load ends, wherein each load area may correspond to one or more AC line(s). The specific determination method is prior art, and thus will not be described in detail herein. Moreover, the voltage of the respective AC lines in the third and fourth AC power can be determined based on the specific requirement of the load ends, and the determination process is prior art, and thus will not be described in detail herein.

It is necessary to explain that, the above UHV HV(high voltage) converter station at rectification side may comprise one HV(high voltage) valve hall or two HV(high voltage) valve halls with different polarities; correspondingly, the UHV LV(low voltage) converter station at rectification side may comprise one LV(low voltage) valve hall or two LV(low voltage) valve halls with different polarities.

When the UHV HV(high voltage) converter station at rectification side comprises two HV(high voltage) valve halls with different polarities, the two HV(high voltage) valve halls with different polarities may be located at different locations; At this time, the two LV(low voltage) valve halls in the UHV LV(low voltage) converter station at rectification side may be located at the same location or different locations.

When the UHV LV(low voltage) converter station at rectification side comprises two LV(low voltage) valve halls with different polarities, the two LV(low voltage) valve halls with different polarities may be located at different locations; at this time, the two HV(high voltage) valve halls in the UHV HV(high voltage) converter station at rectification side may be located at the same location or different locations.

In addition, the UHV HV(high voltage) converter station at inversion side may comprise one HV(high voltage) valve hall or two HV(high voltage) valve halls with different polarities. That is, one UHV HV(high voltage) converter station at inversion side may consist of one or two HV(high voltage) valve hall(s). Correspondingly, one UHV LV(low voltage) converter station at inversion side may comprise one LV(low voltage) valve hall or two LV(low voltage) valve halls with different polarities.

When the UHV HV(high voltage) converter station at inversion side comprises two HV(high voltage) valve halls with different polarities, the two HV(high voltage) valve halls with different polarities may be located at different locations; at this time, the two LV(low voltage) valve halls in the UHV LV(low voltage) converter station at inversion side may be located at the same location or different locations.

When the UHV LV(low voltage) converter station at inversion side comprises two LV(low voltage) valve halls with different polarities, the two LV(low voltage) valve halls with different polarities may be located at different locations; at this time, the two HV(high voltage) valve halls in the UHV HV(high voltage) converter station at inversion side may be located at the same location or different locations.

Figure 17:
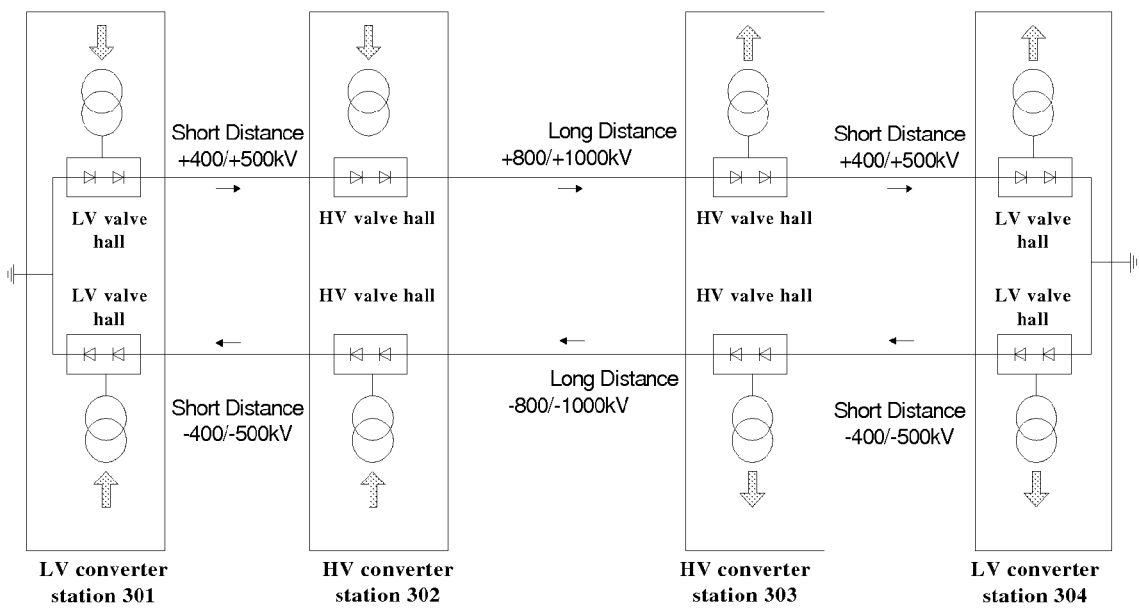
FIG. 17 shows a connection diagram of the high and LV(low voltage) valve halls at rectification side and inversion side.

FIG. 17 shows the case where the UHV LV(low voltage) converter station at rectification side comprises two LV(low voltage) valve halls with different polarities, the UHV HV(high voltage) converter station at rectification side comprises two HV(high voltage) valve halls with different polarities, the UHV HV(high voltage) converter station at inversion side comprises two HV(high voltage) valve halls with different polarities, and the UHV LV(low voltage) converter station at inversion side comprises two LV(low voltage) valve halls with different polarities.

Figure 18:
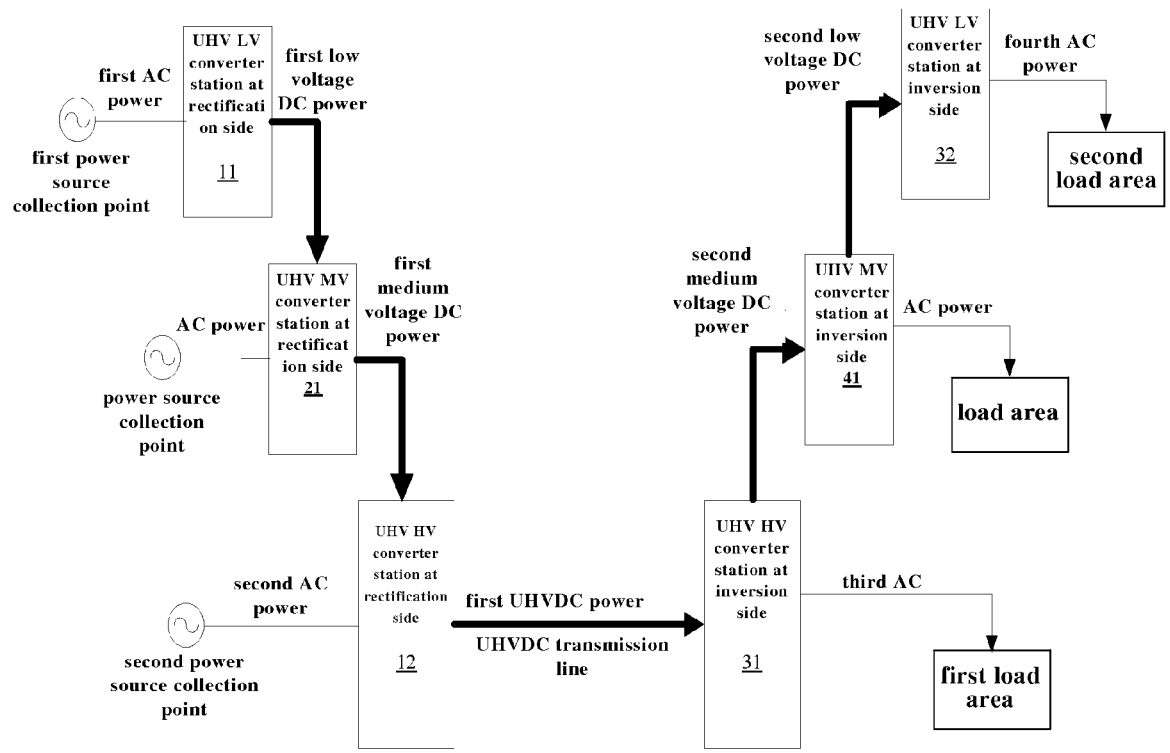
FIG. 18 shows structure and connection diagram according to the second embodiment of the UHVDC transmission system of the present invention.

FIG. 18 shows structure and connection diagram according to the second embodiment of an UHVDC transmission system of the present invention.

As shown in FIG. 18, in comparison with the first embodiment of the UHVDC transmission system, the UHVDC transmission system of this embodiment further comprises: the UHV MV(medium voltage) converter station at rectification side 21 introduced between the UHV LV(low voltage) converter station at rectification side 11 and the UHV HV(high voltage) converter station at rectification side 12, and the UHV MV(medium voltage) converter station at inversion side 41 introduced between the UHV HV(high voltage) converter station at inversion side 31 and the UHV LV(low voltage) converter station at inversion side 32.

Figure 19:
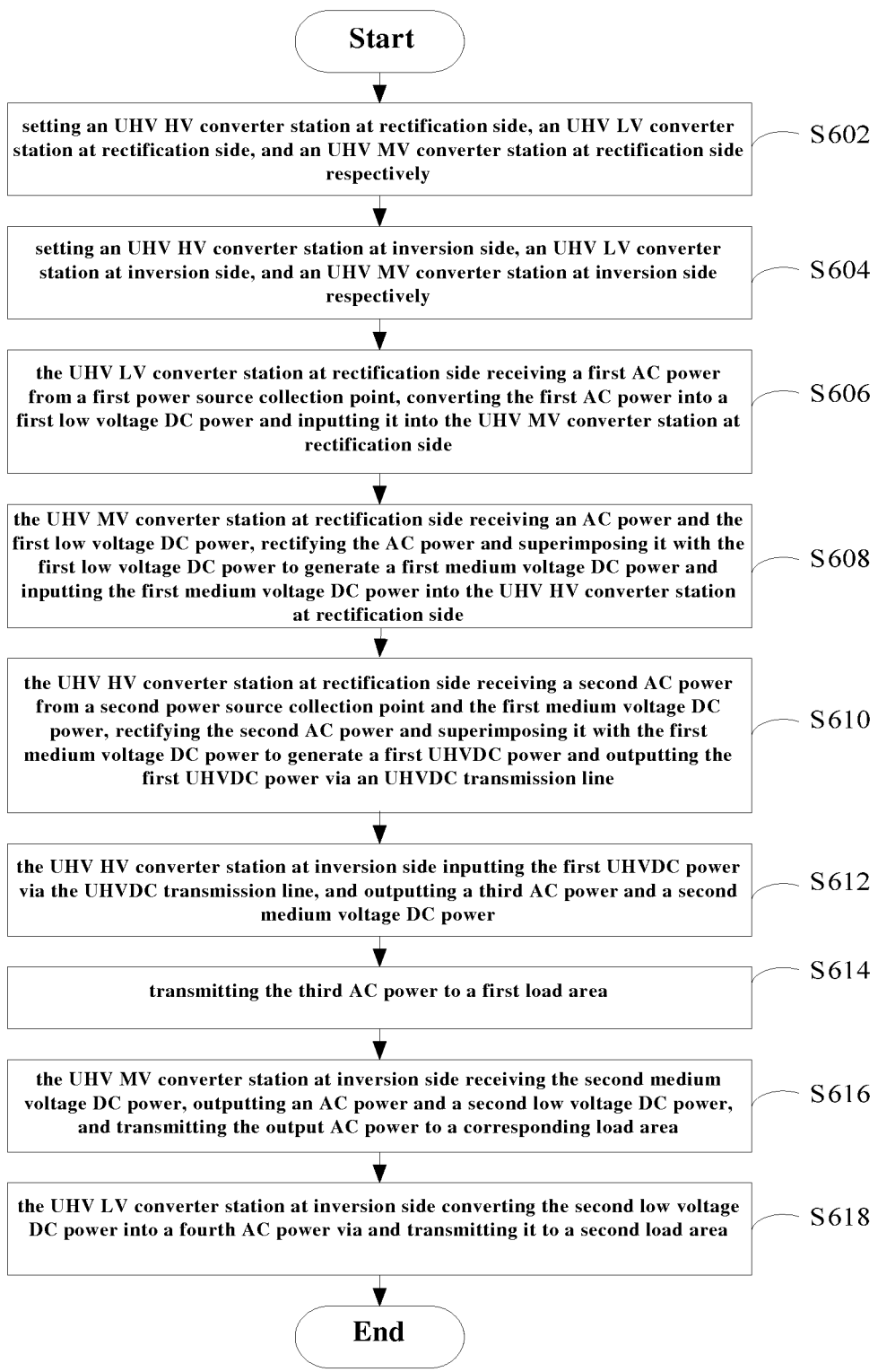
FIG. 19 shows a flow chart of the connection method of the UHVDC transmission system according to the second embodiment as shown in FIG. 18.

FIG. 19 shows a flow chart of the connection method of the UHVDC transmission system according to the second embodiment as shown in FIG. 18.

As shown in FIG. 19, this embodiment comprises the following steps:

S602: setting an UHV HV(high voltage) converter station at rectification side, an UHV LV(low voltage) converter station at rectification side, and an UHV MV(medium voltage) converter station at rectification side respectively;

S604: setting an UHV HV(high voltage) converter station at inversion side, an UHV LV(low voltage) converter station at inversion side, and an UHV MV(medium voltage) converter station at inversion side respectively;

S606: the UHV LV(low voltage) converter station at rectification side receiving a first AC power from a first power source collection point, converting the first AC power into a first low voltage DC power and inputting it into the UHV MV(medium voltage) converter station at rectification side;

S608: the UHV MV(medium voltage) converter station at rectification side receiving an AC power and the first low voltage DC power, rectifying the AC power and superimposing it with the first low voltage DC power to generate a first medium voltage DC power and inputting the first medium voltage DC power into the UHV HV(high voltage) converter station at rectification side;

S610: the UHV HV(high voltage) converter station at rectification side receiving a second AC power from a second power source collection point and the first medium voltage DC power, rectifying the second AC power and superimposing it with the first medium voltage DC power to generate a first UHVDC power and outputting the first UHVDC power via an UHVDC transmission line;

S612: the UHV HV(high voltage) converter station at inversion side inputting the first UHVDC power via the UHVDC transmission line, and outputting a third AC power and a second medium voltage DC power;

S614: transmitting the third AC power to a first load area;

S616: the UHV MV(medium voltage) converter station at inversion side receiving the second medium voltage DC power, outputting an AC power and a second low voltage DC power, and transmitting the output AC power to a corresponding load area;

S618: the UHV LV(low voltage) converter station at inversion side converting the second low voltage DC power into a fourth AC power via and transmitting it to a second load area.

In the above process, the above first and second load areas and the corresponding load area may be physically different load areas.

The number of the UHV MV(medium voltage) converter station at rectification side may be one or more. When there are two or more UHV MV(medium voltage) converter stations at rectification side, the two or more UHV MV(medium voltage) converter stations at rectification side are cascaded sequentially, wherein each UHV MV(medium voltage) converter at rectification side of the two or more UHV MV(medium voltage) converter stations at rectification side receives a corresponding AC power and the input DC power, rectifies the corresponding AC power and superimposes it with the input DC power, and outputs the superimposed DC power.

Optionally, the number of the UHV MV(medium voltage) converter station at inversion side may be one or more. When there are two or more UHV MV(medium voltage) converter stations at inversion side, the two or more UHV MV(medium voltage) converter stations at inversion side are cascaded sequentially, wherein each UHV MV(medium voltage) converter station at inversion side of the two or more UHV MV(medium voltage) converter stations at inversion side receives the input DC power, and outputs corresponding AC power and DC power.

Figure 20:
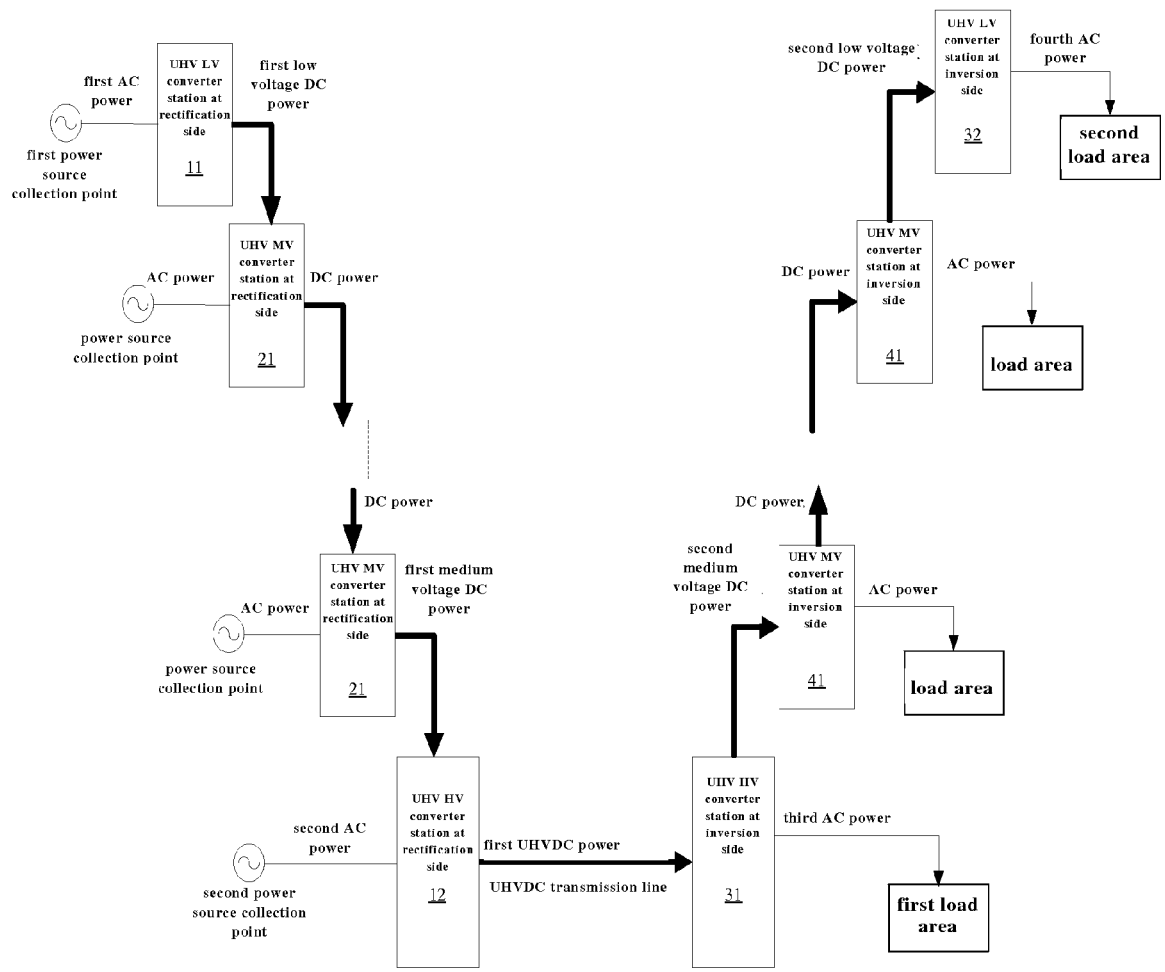
FIG. 20 shows a connection diagram of the UHV converter stations at rectification side and inversion side of the present invention, both comprising two or more UHV MV(medium voltage) converter stations.

FIG. 20 shows the case where there are two or more UHV MV(medium voltage) converter stations at rectification side, and two or more UHV MV(medium voltage) converter stations at inversion side.

Wherein, the voltage of the first UHVDC power may be above ±750 KV. For example, the voltage of the first UHVDC power is ±1000 KV or ±1200 KV.

When the voltage of the first UHVDC power is ±1000 KV, the voltage of the first low voltage DC power may be in a range of 300 KV-600 KV, and optionally, in a symmetric case, the voltage of the first low voltage DC power is ⅓ of that of the first UHVDC power, i.e., 333.3 KV; in an asymmetric case, the voltage of the first low voltage DC power may be 400 KV. The voltage of the first medium voltage DC power may be in a range of 600 KV-900 KV, and optionally, in a symmetric case, the voltage of the first medium voltage DC power is ⅔ of that of the first UHV DC power, i.e., 666.6 KV; and in an asymmetric case, the voltage of the first medium voltage DC power may be 800 KV. The voltage of the second medium voltage DC power may be in a range of 600 KV-900 KV. Optionally, in a symmetric case, the voltage of the second medium voltage DC power is ⅔ of that of the first UHV DC power, i.e., 666.6 KV; in an asymmetric case, the voltage of the second medium voltage DC power may be 800 KV; the voltage of the second low voltage DC power can be in a range of 300 KV-600 KV, and optionally, in a symmetric case, the voltage of the second low voltage DC power is ⅓ of that of the first UHV DC power, i.e., 333.3 KV; and in an asymmetric case, the voltage of the second low voltage DC power may be 400 KV.

When the voltage of the first UHVDC power is ±1200 KV, in the symmetric case, the voltage of the first low voltage DC power is 400 KV, and the voltage of the first medium voltage DC power is 800 KV; and in the asymmetric case, the voltage of the first low voltage DC power is 500 KV, and the voltage of the first medium voltage DC power is 1000 KV. In the symmetric case, the voltage of the second medium voltage DC power is 800 KV, and the voltage of the second low voltage DC power is 400 KV; and in the asymmetric case, the voltage of the second medium voltage DC power is 1000 KV, and the voltage of the second low voltage DC power is 500 KV.

When the above symmetric arrangement is employed, the output power of the electric grid can be effectively guaranteed.

It is necessary to explain that, the UHV HV(high voltage) converter station at rectification side may comprise one HV(high voltage) valve hall or two HV(high voltage) valve halls with different polarities; the UHV LV(low voltage) converter station at rectification side can comprise one LV(low voltage) valve hall or two LV(low voltage) valve halls with different polarities; and the UHV MV(medium voltage) converter station at rectification side can comprise one MV(medium voltage) valve hall or two MV(medium voltage) valve halls with different polarities.

When the UHV HV(high voltage) converter station at rectification side comprises two HV(high voltage) valve halls with different polarities, the two HV(high voltage) valve halls with different polarities may be located at different locations; at this time, the two LV(low voltage) valve halls in the UHV LV(low voltage) converter station at rectification side may be located at the same location or different locations, and the two MV(medium voltage) valve halls in the UHV MV(medium voltage) converter station at rectification side may be located at the same location or different locations.

When the UHV LV(low voltage) converter station at rectification side comprises two LV(low voltage) valve halls with different polarities, the two LV(low voltage) valve halls with different polarities may be located at different locations; at this time, the two HV(high voltage) valve halls in the UHV HV(high voltage) converter station at rectification side may be located at the same location or different locations, and the two MV(medium voltage) valve halls in the UHV MV(medium voltage) converter station at rectification side may be located at the same location or different locations.

When the UHV MV(medium voltage) converter station at rectification side comprises two MV(medium voltage) valve halls with different polarities, the two MV(medium voltage) valve halls with different polarities may be located at different locations; at this time, the two HV(high voltage) valve halls in the UHV HV(high voltage) converter station at rectification side may be located at the same location or different locations, and the two LV(low voltage) valve halls in the UHV LV(low voltage) converter station at rectification side may be located at the same location or different locations.

It is necessary to explain that, the UHV HV(high voltage) converter station at inversion side may comprise one HV(high voltage) valve hall or two HV(high voltage) valve halls with different polarities; the UHV LV(low voltage) converter station at inversion side can comprise one LV(low voltage) valve hall or two LV(low voltage) valve halls with different polarities; and the UHV MV(medium voltage) converter station at inversion side can comprise one MV(medium voltage) valve hall or two MV(medium voltage) valve halls with different polarities.

When the UHV HV(high voltage) converter station at inversion side comprises two HV(high voltage) valve halls with different polarities, the two HV(high voltage) valve halls with different polarities may be located at different locations; at this time, the two LV(low voltage) valve halls in the UHV LV(low voltage) converter station at inversion side may be located at the same location or different locations, and the two MV(medium voltage) valve halls in the UHV MV(medium voltage) converter station at inversion side may be located at the same location or different locations.

When the UHV LV(low voltage) converter station at inversion side comprises two LV(low voltage) valve halls with different polarities, the two LV(low voltage) valve halls with different polarities may be located at different locations; at this time, the two HV(high voltage) valve halls in the UHV HV(high voltage) converter station at inversion side may be located at the same location or different locations, and the two MV(medium voltage) valve halls in the UHV MV(medium voltage) converter station at inversion side may be located at the same location or different locations.

When the UHV MV(medium voltage) converter station at inversion side comprises two MV(medium voltage) valve halls with different polarities, the two MV(medium voltage) valve halls with different polarities may be located at different locations; at this time, the two HV(high voltage) valve halls in the UHV HV(high voltage) converter station at inversion side may be located at the same location or different locations, and the two LV(low voltage) valve halls in the UHV LV(low voltage) converter station at inversion side may be located at the same location or different locations.

According to this embodiment, the UHV HV(high voltage) converter station at rectification side and the UHV LV(low voltage) converter station at rectification side are set at different physical locations, so that it is unnecessary to converge power sources for the first and second power source collection points at rectification side, which reduces the number of the loops of the AC lines into the UHV converter station at rectification side, reduces the power transmission cost and transmission loss, and obtains better economic benefit. Moreover, since the UHV HV(high voltage) converter station at inversion side and the UHV LV(low voltage) converter station at inversion side are set at different physical locations, the electric energy can be projected directly to multiple load centers at inversion side, which reduces power foldback and power loss due to power transmission among load areas, and meanwhile facilitates supplying electric energy to the load end.

The second embodiment of the UHVDC transmission system, in comparison with the first embodiment, introduces at least one UHV MV(medium voltage) converter station at rectification side, which makes the UHV HV(high voltage) converter station at rectification side of the second embodiment can output a first UHVDC power higher than that of the first embodiment. At the same time, compared with the first embodiment, the second embodiment can facilitate collection of more dispersed AC power sources. Moreover, since at least one UHV MV(medium voltage) converter station at inversion side is introduced, the inversion side of the second embodiment can better facilitate supplying power to multiple load areas. Meanwhile, the security stability of the electric grid will be better.

It is necessary to explain that, the relationship terminology used herein, such as the first, the second, etc., is only for the purpose of distinguishing one entity or operation from another entity or operation, and is not intended to limit or suggest relationship or sequence of these entities or operations. Moreover, the terminology "comprising", "including" or any other alterations are intended to cover non-exclusive inclusion, so as to make a process, method, article or apparatus including a series of elements further includes elements that are not listed explicitly other than said series of elements, or includes elements inherent to such process, method, article or apparatus. The element limited by expression of "comprising a . . . " does not exclude a case where there are other same elements in the process, method, article or apparatus including this subject without more limitations.

The embodiments described above are merely preferred embodiments of the present invention, but is not intended to limit the scope of the present invention. The present invention also encompasses any modifications, equivalent substitution and variations made within the principle and spirit of the invention.

What is claimed is:

1. A connection method for UHVDC transmission at rectification side, comprising:
    setting an UHV HV converter station at rectification side comprising two HV valve halls with different polarities and an UHV LV converter station at rectification side comprising two LV valve halls with different polarities, respectively;
    said UHV LV converter station at rectification side receiving a first AC power from a first power source collection point, converting said first AC power into a first low voltage DC power and inputting it into said UHV HV converter station at rectification side;
    said UHV HV converter station at rectification side receiving a second AC power from a second power source collection point and said first low voltage DC power, rectifying said second AC power and superimposing it with said first low voltage DC power to generate a first UHVDC power and outputting the first UHVDC power via an UHV DC transmission line, wherein said two HV valve halls with different polarities are located at different locations and/or said two LV valve halls with different polarities are located at different locations.

2. A connection method for UHVDC transmission at inversion side, comprising:
    setting an UHV HV converter station at inversion side comprising two HV valve halls with different polarities and an UHV LV converter station at inversion side comprising two LV valve halls with different polarities, respectively;
    said UHV HV converter station at inversion side inputting a first UHVDC power via an UHVDC transmission line, and outputting a third AC power and a second low voltage DC power;
    transmitting said third AC power to a first load area;
    said UHV LV converter station at inversion side converting said second low voltage DC power into a fourth AC power and transmitting it to a second load area, wherein said two HV valve halls with different polarities are located at different locations and/or said two LV valve halls with different polarities are located at different locations.

3. A connection method for UHVDC transmission, comprising:
setting an UHV HV converter station at rectification side comprising two HV valve halls with different polarities and an UHV LV converter station at rectification side comprising two LV valve halls with different polarities, respectively;
setting an UHV HV converter station at inversion side and an UHV LV converter station at inversion side, respectively;
said UHV LV converter station at rectification side receiving a first AC power from a first power source collection point, converting said first AC power into a first low voltage DC power and inputting it to the UHV HV converter station at rectification side;
the UHV HV converter station at rectification side receiving a second AC power from a second power source collection point and said first low voltage DC power, rectifying the second AC power and superimposing it with the first low voltage DC power to generate a first UHVDC power and outputting the first UHVDC power via an UHVDC transmission line;
said UHV HV converter station at inversion side inputting the first UHVDC power via the UHVDC transmission line, and outputting a third AC power and a second low voltage DC power;
transmitting said third AC power to a first load area;
said UHV LV converter station at inversion side converting said second low voltage DC power into a fourth AC power and transmitting it to a second load area, wherein said two HV valve halls with different polarities are located at different locations and/or said two LV valve halls with different polarities are located at different locations.

4. The method according to claim 3, wherein
said UHV HV converter station at inversion side comprises two HV valve halls with different polarities;
said UHV LV converter station at inversion side comprises two LV valve halls with different polarities.

5. The method according to claim 4, wherein
said two HV valve halls with different polarities of the UHV HV converter station at inversion side are located at different locations and/or said two LV valve halls with different polarities of the UHV LV converter station at inversion side are located at different locations.

6. A connection method for UHVDC transmission at rectification side, comprising:
setting an UHV HV converter station at rectification side comprising two HV valve halls with different polarities, an UHV LV converter station at rectification side comprising two LV valve halls with different polarities, and an UHV MV converter station at rectification side comprising two MV valve halls with different polarities, respectively;
said UHV LV converter station at rectification side receiving a first AC power from a first power source collection point, converting said first AC power into a first low voltage DC power and inputting it into said UHV MV converter station at rectification side;
said UHV MV converter station at rectification side receiving an AC power and said first low voltage DC power, rectifying said AC power and superimposing it with said first low voltage DC power to generate a first medium voltage DC power and outputting the first medium voltage DC power to said UHV HV converter station at rectification side;
said UHV HV converter station at rectification side receiving a second AC power from a second power source collection point and said first medium voltage DC power, rectifying said second AC power and superimposing it with the first medium voltage DC power to generate a first UHVDC power and outputting the first UHVDC power via an UHVDC transmission line, wherein said two HV valve halls with different polarities are located at different locations, and/or the two MV valve halls with different polarities are located at different locations, and/or the two LV valve halls with different polarities are located at different locations.

7. The method according to claim 6, wherein the number of said UHV MV converter station at rectification side is one or more.

8. The method according to claim 7, wherein when there are two or more said UHV MV converter stations at rectification side, said two or more UHV MV converter stations at rectification side are cascaded sequentially, and said method further comprises:
each UHV MV converter at rectification side receiving a corresponding AC power and the input DC power, rectifying said corresponding AC power and superimposing it with the input DC power, and outputting the superimposed DC power.

9. A connection method for UHVDC transmission at inversion side, comprising:
setting an UHV HV converter station at inversion side comprising two HV valve halls with different polarities, an UHV LV converter station at inversion side comprising two LV valve halls with different polarities, and an UHV MV converter station at inversion side comprising two MV valve halls with different polarities, respectively;
said UHV HV converter station at inversion side inputting a first UHVDC power via an UHVDC transmission line, and outputting a third AC power and a second medium voltage DC power;
transmitting said third AC power to a first load area;
said UHV MV converter station at inversion side receiving said second medium voltage DC power, outputting an AC power and a second low voltage DC power, and transmitting the output AC power to a corresponding load area;
said UHV LV converter station at inversion side converting said second low voltage DC power into a fourth AC power and transmitting it to a second load area, wherein said two HV valve halls with different polarities are located at different locations, and/or the two MV valve halls with different polarities are located at different locations, and/or the two LV valve halls with different polarities are located at different locations.

10. The method according to claim 9, wherein the number of said UHV MV converter station at inversion side is one or more.

11. The method according to claim 10, wherein, when there are two or more said UHV MV converter stations at inversion side, the two or more UHV MV converter stations at inversion side are cascaded sequentially, and said method further comprises:
each UHV MV converter station at inversion side receiving the input DC power, outputting corresponding AC power and DC power, and transmitting said corresponding AC power to corresponding load area.

12. A connection method for UHVDC transmission, comprising:
- setting an UHV HV converter station at rectification side comprising two HV valve halls with different polarities, an UHV LV converter station at rectification side comprising two LV valve halls with different polarities, and an UHV MV converter station at rectification side comprising two MV valve halls with different polarities, respectively;
- setting an UHV HV converter station at inversion side, an UHV LV converter station at inversion side, and an UHV MV converter station at inversion side, respectively;
- said UHV LV converter station at rectification side receiving a first AC power from a first power source collection point, converting said first AC power into a first low voltage DC power and inputting it to said UHV MV(medium voltage converter station at rectification side;
- said UHV MV converter station at rectification side receiving an AC power and said first low voltage DC power, rectifying said AC power and superimposing it with said first low voltage DC power to generate a first medium voltage DC power and inputting the first medium voltage DC power to the UHV HV converter station at rectification side;
- said UHV HV converter station at rectification side receiving a second AC power from a second power source collection point and said first medium voltage DC power, rectifying said second AC power and superimposing it with said first medium voltage DC power to generate a first UHV DC power and outputting the first UHVDC power via an UHVDC transmission line;
- said UHV HV converter station at inversion side inputting the first UHVDC power via the UHVDC transmission line, and outputting a third AC power and a second medium voltage DC power;
- transmitting said third AC power to a first load area;
- said UHV MV converter station at inversion side receiving said second medium voltage DC power, outputting an AC power and a second low voltage DC power, and transmitting the output AC power to a corresponding load area; and
- said UHV LV converter station at inversion side converting said second low voltage DC power into a fourth AC power and transmitting it to a second load area, wherein said two HV valve halls with different polarities are located at different locations, and/or the two MV valve halls with different polarities are located at different locations, and/or the two LV valve halls with different polarities are located at different locations.

13. The method according to claim 12, wherein the number of said UHV MV converter station at rectification side is one or more.

14. The method according to claim 13, wherein, when there are two or more said UHV MV converter stations at rectification side, said two or more UHV MV converter stations at rectification side are cascaded sequentially, and said method further comprises:
- each UHV MV converter at rectification side receiving a corresponding AC power and the input DC power, rectifying said corresponding AC power and superimposing it with the input DC power, and outputting the superimposed DC power.

15. The method according to claim 12, wherein, the number of said UHV MV converter station at inversion side is one or more.

16. The method according to claim 15, wherein, when there are two or more said UHV MV converter stations at inversion side, said two or more UHV MV converter stations at inversion side are cascaded sequentially, and said method further comprises:
- each UHV MV converter station at inversion side receiving the input DC power, outputs corresponding AC power and DC power, and transmitting said corresponding AC power to corresponding load area.

17. The method according to claim 12, wherein,
- said UHV HV converter station at inversion side comprises two HV valve halls with different polarities;
- said UHV MV converter station at inversion side comprises two MV valve halls with different polarities;
- said UHV LV converter station at inversion side comprises two LV valve halls with different polarities.

18. The method according to claim 17, wherein,
- said two HV valve halls with different polarities of the UHV HV converter station at inversion side are located at different locations, and/or said two MS(medium voltage) valve halls with different polarities of the UHV MV converter station at inversion side are located at different locations, and/or said two LV valve halls with different polarities of the UHV LV converter station at inversion side are located at different locations.

19. An UHV converter station at rectification side, comprising:
- an UHV LV converter station at rectification side comprising two LV valve halls with different polarities for receiving a first AC power from a first power source collection point, converting said first AC power into a first low voltage DC power and inputting it into an UHV HV converter station at rectification side comprising two HV valve halls with different polarities;
- said UHV HV converter station at rectification side for receiving a second AC power from a second power source collection point and said first low voltage DC power, rectifying said second AC power and superimposing it with the first low voltage DC power to generate a first UHVDC power and outputting the first UHVDC power via an UHVDC transmission line, wherein said two HV valve halls with different polarities are located at different locations and/or said two LV valve halls with different polarities are located at different locations.

20. The UHV converter station at rectification side according to claim 19, wherein, said UHV LV converter station at rectification side comprises:
- a first power source input module for receiving the first AC power from the first power source collection point, and transmitting said first AC power to a first power source conversion module;
- said first power source conversion module for converting said first AC power into the first low voltage DC power and outputting it to said UHV HV converter station at rectification side.

21. The UHV converter station at rectification side according to claim 19, wherein said UHV HV converter station at rectification side comprises:
- a second power source input module for receiving the second AC power from the second power source collection point, and transmitting it to a second power source conversion module;
- said second power source conversion module for rectifying said second AC power and superimposing it with the first low voltage DC power to generate the first UHVDC power and outputting the first UHVDC power via the UHVDC transmission line.

22. An UHVDC transmission system, said system comprises:
   the UHV converter station at rectification side according to claim 19; and
   an UHV converter station at inversion side comprising:
      an UHV HV converter station at inversion side comprising two HV valve halls with different polarities for inputting said first UHVDC power via said UHVDC transmission line, outputting a third AC power and a second low voltage DC power, and transmitting said third AC power to a first load area; and
      an UHV LV converter station at inversion side comprising two LV valve halls with different polarities for converting said second low voltage DC power into a fourth AC power and transmitting it to a second load area, wherein said two HV valve halls with different polarities are located at different locations and/or said two LV valve halls with different polarities are located at different locations,
   wherein the UHV HV converter station at rectification side and the UHV HV converter station at inversion side are connected via said UHVDC transmission line.

23. The UHVDC transmission system according to claim 22, wherein said two HV valve halls with different polarities of the UHV HV converter station at inversion side are located at different locations.

24. An UHV converter station at inversion side, comprising:
   an UHV HV converter station at inversion side comprising two HV valve halls with different polarities for inputting a first UHVDC power via an UHVDC transmission line, outputting a third AC power and a second low voltage DC power, and transmitting said third AC power to a first load area;
   an UHV LV converter station at inversion side comprising two LV valve halls with different polarities for converting said second low voltage DC power into a fourth AC power and transmitting it to a second load area, wherein said two HV valve halls with different polarities are located at different locations and/or said two LV valve halls with different polarities are located at different locations.

25. The UHV converter station at inversion side according to claim 24, wherein, said UHV HV converter station at inversion side comprises:
   a fourth power source input module for receiving the first UHVDC power input via the UHVDC transmission line, and transmitting it to a fourth power source conversion module;
   the fourth power source conversion module for receiving said first UHVDC power, outputting the third AC power and the second low voltage DC power, transmitting said third AC power to the first load area, and transmitting said second low voltage DC power to said UHV LV converter station at inversion side.

26. The UHV converter station at inversion side according to claim 24, wherein, said UHV LV converter station at inversion side comprises:
   a third power source input module for receiving said second low voltage DC power and transmitting it to a third power source conversion module;
   said third power source conversion module for converting said second low voltage DC power into the fourth AC power, and transmitting it to the second load area.

27. An UHV converter station at rectification side, comprising:
   an UHV LV converter station at rectification side comprising two LV valve halls with different polarities for receiving a first AC power from a first power source collection point, converting said first AC power into a first low voltage DC power and inputting it into an UHV MV converter station at rectification side comprising two MV valve halls with different polarities;
   said UHV MV converter station at rectification side for receiving an AC power and said first low voltage DC power, rectifying said AC power and superimposing it with said first low voltage DC power to generate a first medium voltage DC power and inputting the first medium voltage DC power into an UHV HV converter station at rectification side comprising two HV valve halls with different polarities;
   said UHV HV converter station at rectification side for receiving a second AC power from a second power source collection point and said first medium voltage DC power, rectifying said second AC power and superimposing it with said first medium voltage DC power to generate a first UHVDC power and outputting the first UHVDC power via an UHVDC transmission line, wherein said two HV valve halls with different polarities are located at different locations, and/or said two MV valve halls with different polarities are located at different locations, and/or said two LV valve halls with different polarities are located at different locations.

28. The UHV converter station at rectification side according to claim 27, wherein, said UHV LV converter station at rectification side comprises:
   a first power source input module for receiving the first AC power from the first power source collection point, and transmitting said first AC power to a first power source conversion module;
   said first power source conversion module for converting said first AC power into the first low voltage DC power and outputting it to the UHV MV converter station at rectification side connected to said UHV LV converter station at rectification side.

29. The UHV converter station at rectification side according to claim 27, wherein, the number of said UHV MV converter station at rectification side is one or more.

30. The UHV converter station at rectification side according to claim 29, wherein, when there are two or more said UHV MV converter stations at rectification side, said two or more UHV MV converter stations at rectification side are cascaded sequentially.

31. The UHV converter station at rectification side according to claim 27, wherein, said UHV MV converter station at rectification side comprises:
   a fifth power source input module for receiving an AC power from a corresponding power source collection point, and transmitting it to a fifth power source conversion module;
   said fifth power source conversion module for rectifying said AC power and superimposing it with the input DC power, and outputting the superimposed DC power.

32. The UHV converter station at rectification side according to claim 27, wherein, said UHV HV converter station at rectification side comprises:
   a second power source input module for receiving the second AC power from the second power source collection point, and transmitting it to a second power source conversion module;

said second power source conversion module, for rectifying said second AC power and superimposing it with the input DC power to generate the first UHVDC power and outputting the first UHVDC power via the UHVDC transmission line.

33. An UHVDC transmission system,
said system comprises:
the UHV converter station at rectification side according to claim 27; and
an UHV converter station at inversion side, comprising:
an UHV HV converter station at inversion side comprising two HV valve halls with different polarities for inputting said first UHVDC power via said UHVDC transmission line, outputting a third AC power and a second medium voltage DC power, and transmitting said third AC power to a first load area, transmitting said second medium voltage DC power to an UHV MV converter station at inversion side comprising two MV valve halls with different polarities, said UHV MV converter station at inversion side for receiving said second medium voltage DC power, outputting an AC power and a second low voltage DC power, and transmitting the output AC power to a corresponding load area;
an UHV LV converter station at inversion side comprising two LV valve halls with different polarities for receiving said second low voltage DC power, and converting it into a fourth AC power and transmitting it to a second load area, wherein said two HV valve halls with different polarities of the UHV HV converter station at inversion side are located at different locations, and/or said two MV valve halls with different polarities of the UHV MV converter station at inversion side are located at different locations, and/or the two LV valve halls with different polarities of the UHV LV converter station at inversion side are located at different locations,
wherein the UHV HV converter station at rectification side is connected to the UHV HV converter station at inversion side via said UHVDC transmission line.

34. The UHVDC transmission system according to claim 33, wherein, the number of said UHV MV converter station at rectification side is one or more.

35. The UHVDC transmission system according to claim 34, wherein, when there are two or more said UHV MV converter stations at rectification side, said two or more UHV MV converter stations at rectification side are cascaded sequentially.

36. The UHVDC transmission system according to claim 33, wherein, the number of said UHV MV converter station at inversion side is one or more.

37. The UHVDC transmission system according to claim 36, wherein, when there are two or more said UHV MV converter stations at inversion side, said two or more UHV MV converter stations at inversion side are cascaded sequentially.

38. The UHVDC transmission system according to claim 33, said two MV valve halls with different polarities of the UHV MV converter station at inversion side are located at different locations.

39. An UHV converter station at inversion side, comprising:
an UHV HV converter station at inversion side comprising two HV valve halls with different polarities for inputting a first UHVDC power via an UHVDC transmission line, outputting a third AC power and a second medium voltage DC power, and transmitting said third AC power to a first load area, transmitting said second medium voltage DC power to an UHV MV converter station at inversion side comprising two MV valve halls with different polarities;
said UHV MV converter station at inversion side for receiving said second medium voltage DC power, outputting an AC power and a second low voltage DC power, and transmitting the output AC power to a corresponding load area;
an UHV LV converter station at inversion side comprising two LV valve halls with different polarities for receiving said second low voltage DC power, and converting it into a fourth AC power and transmitting it to a second load area, wherein said two HV valve halls with different polarities of the UHV HV converter station at inversion side are located at different locations, and/or said two MV valve halls with different polarities of the UHV MV converter station at inversion side are located at different locations, and/or the two LV valve halls with different polarities of the UHV LV converter station at inversion side are located at different locations.

40. The UHV converter station at inversion side according to claim 39, wherein, said UHV HV converter station at inversion side comprises:
a fourth power source input module for receiving the first UHVDC power via the UHVDC transmission line, and transmitting it to a fourth power source conversion module;
said fourth power source conversion module for receiving said first UHVDC power, outputting the third AC power and the second medium voltage DC power, transmitting said third AC power to the first load area, and transmitting said second medium voltage DC power to the UHV MV converter station at inversion side connected with said UHV HV converter station at inversion side.

41. The UHV converter station at inversion side according to claim 39, wherein, the number of said UHV MV converter station at inversion side is one or more.

42. The UHV converter station at inversion side according to claim 41, wherein, when there are two or more said UHV MV converter stations at inversion side, the two or more UHV MV converter stations at inversion side are cascaded sequentially.

43. The UHV converter station at inversion side according to claim 39, wherein, said UHV MV converter station at inversions side comprises:
a sixth power source input module for receiving the input DC power and transmitting it to a sixth power source conversion module;
said sixth power source conversion module for receiving the input DC power and outputting the AC power and DC power and transmitting the output AC power to the corresponding load area.

44. The UHV converter station at inversion side according to claim 39, wherein, said UHV LV converter station at inversions side comprises:
a third power source input module for receiving the input DC power and transmitting it to a third power source conversion module;
said third power source conversion module for converting the input DC power into the fourth AC power and transmitting it to the second load area.

* * * * *